(12) United States Patent
Botwick et al.

(10) Patent No.: US 11,522,824 B2
(45) Date of Patent: Dec. 6, 2022

(54) DISPLAYING A DATABASE RECORD IN A CHAT PLATFORM

(71) Applicant: salesforce.com, inc., San Francisco, CA (US)

(72) Inventors: Nate Botwick, San Francisco, CA (US); Anh Khuc, Millbrae, CA (US); Ben Cronin, Newton, MA (US); Matt Chan, San Francisco, CA (US); Chris Masterson, San Francisco, CA (US); Dave Engelberg, Seattle, WA (US); Diana Berlin, San Francisco, CA (US); Merwan Hade, San Francisco, CA (US); John Brock, Oakland, CA (US); Andy Chung, Berkley, CA (US); Justin Edmund, San Francisco, CA (US); Norris Lee, South San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 16/926,166

(22) Filed: Jul. 10, 2020

(65) Prior Publication Data

US 2022/0014492 A1 Jan. 13, 2022

(51) Int. Cl.
*H04L 51/42* (2022.01)
*G06F 16/9032* (2019.01)
(Continued)

(52) U.S. Cl.
CPC .......... *H04L 51/42* (2022.05); *G06F 16/9032* (2019.01); *G06F 16/90344* (2019.01); *H04L 51/046* (2013.01); *H04L 51/216* (2022.05)

(58) Field of Classification Search
CPC ....... H04L 51/22; H04L 51/16; H04L 51/046; G06Q 50/01; G06F 16/90344;
(Continued)

(56) References Cited

U.S. PATENT DOCUMENTS

| 8,938,669 B1 * | 1/2015 | Cohen | H04L 65/403 |
| | | | 715/255 |
| 2006/0129541 A1 * | 6/2006 | Morgan | G06F 16/90335 |

(Continued)

OTHER PUBLICATIONS

International Search Report and Written Opinion of the International Searching Authority directed to related International Patent Application No. PCT/US2021/015855 dated May 4, 2021; 10 pages.

*Primary Examiner* — Caroline H Jahnige
(74) *Attorney, Agent, or Firm* — Sterne, Kessler, Goldstein & Fox P.L.L.C.

(57) ABSTRACT

Provided herein are system, apparatus, device, method and/or computer program product embodiments, and/or combinations and sub-combinations thereof for displaying a database record in a chat platform. In a given embodiment, a server may detect a request to launch a search window, including an input field. The server may cause the display of the search window, including the input field, in response to detecting the request to launch the search window. The server may receive a string via the input field. The server may query a database for a database record matching the string. The server may receive a selection of the database record from the chat participant. The server may cause display of a subset of fields of the database record in the chat session.

20 Claims, 13 Drawing Sheets

(51) Int. Cl.
*G06F 16/903* (2019.01)
*H04L 51/046* (2022.01)
*H04L 51/00* (2022.01)
*H04L 51/216* (2022.01)

(58) Field of Classification Search
CPC .. G06F 16/3322; G06F 16/248; G06F 3/0237; G06F 16/9032; G06F 16/951; G06F 16/176
See application file for complete search history.

(56) References Cited

U.S. PATENT DOCUMENTS

| | | | |
|---|---|---|---|
| 2016/0006856 A1* | 1/2016 | Bruno | H04M 1/72436 715/809 |
| 2016/0314194 A1* | 10/2016 | Hood | G06F 16/9038 |
| 2017/0329864 A1* | 11/2017 | Micucci | G06F 16/90 |
| 2018/0336280 A1* | 11/2018 | Yin | G06Q 50/01 |
| 2019/0138583 A1 | 5/2019 | Silk et al. | |

* cited by examiner

DISPLAYING A DATABASE RECORD IN A CHAT PLATFORM

BACKGROUND

Traveling salespeople often use chat platforms to communicate with colleagues using online chat platforms. The salespeople may need to communicate database records such as sales records to other colleagues. For example, a salesperson may need to alert another salesperson of a sales opportunity. The sales opportunity may correspond with a sales record, including multiple data fields. The data fields may be stored in a database. The salesperson may need to share a subset of the data fields with the other salesperson. Furthermore, the other salesperson may need to update the sales record while traveling. For example, the other salesperson may need to update the sales record after closing a sale. In the event, Conventional systems require a salesperson to share copies of individual data fields of a database record. Furthermore, the individual data fields are copies of the data fields. Therefore, conventional systems do not provide an interface for quickly updating the data fields of the sales record through a chat platform.

BRIEF DESCRIPTION OF THE DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

FIG. 7 is a block diagram of an interface of a desktop collaborative application, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof for displaying a database record in a chat platform.

Conventional systems only allow using chat platforms to transmit messages, images, or the like. Furthermore, conventional systems only allow a user to share a copy of a data field from a database instead of the actual data field. This prevents a user from being allowed to update the data fields from the chat platform. In some instances, it may be useful to share the actual data field of the database record in a chat platform, so that a user can provide the current values of the data fields in the chat platforms and allow other users to update the data fields if necessary.

In a given embodiment, a server may detect a request to launch a search window, including an input field. The request occurs in a chat platform executing a chat session between two or more chat participants. The request may be detected in response to a chat participant selecting an input button of the chat platform. The server may cause the display of the search window, including the input field, in response to detecting the request to launch the search window. The server may receive a string via the input field. The server may query a database for a database record matching the string. The querying may be automatically updated based on the modification of the string. The modification may include deleting or adding a character in the string. The server cause display of the result of the query in the chat session. The result may include the name of the database record encoded with a database identifier of the database record. The server may receive a selection of the database record from the chat participant. The server may cause display of a subset of fields of the database record in the chat session.

The above configuration allows a chat participant to search for, retrieve, and share database records in the chat session within the chat platform. As a result, the chat participant may seamlessly incorporate database records in a chat session. This avoids steps of using a system that is separate from the chat platform to retrieve database records. Furthermore, this avoids manually formatting a retrieved database record so that it may be incorporated in the chat session. Therefore, the above configuration saves operational resources by seamlessly incorporating database records in a chat session.

Figure 1:
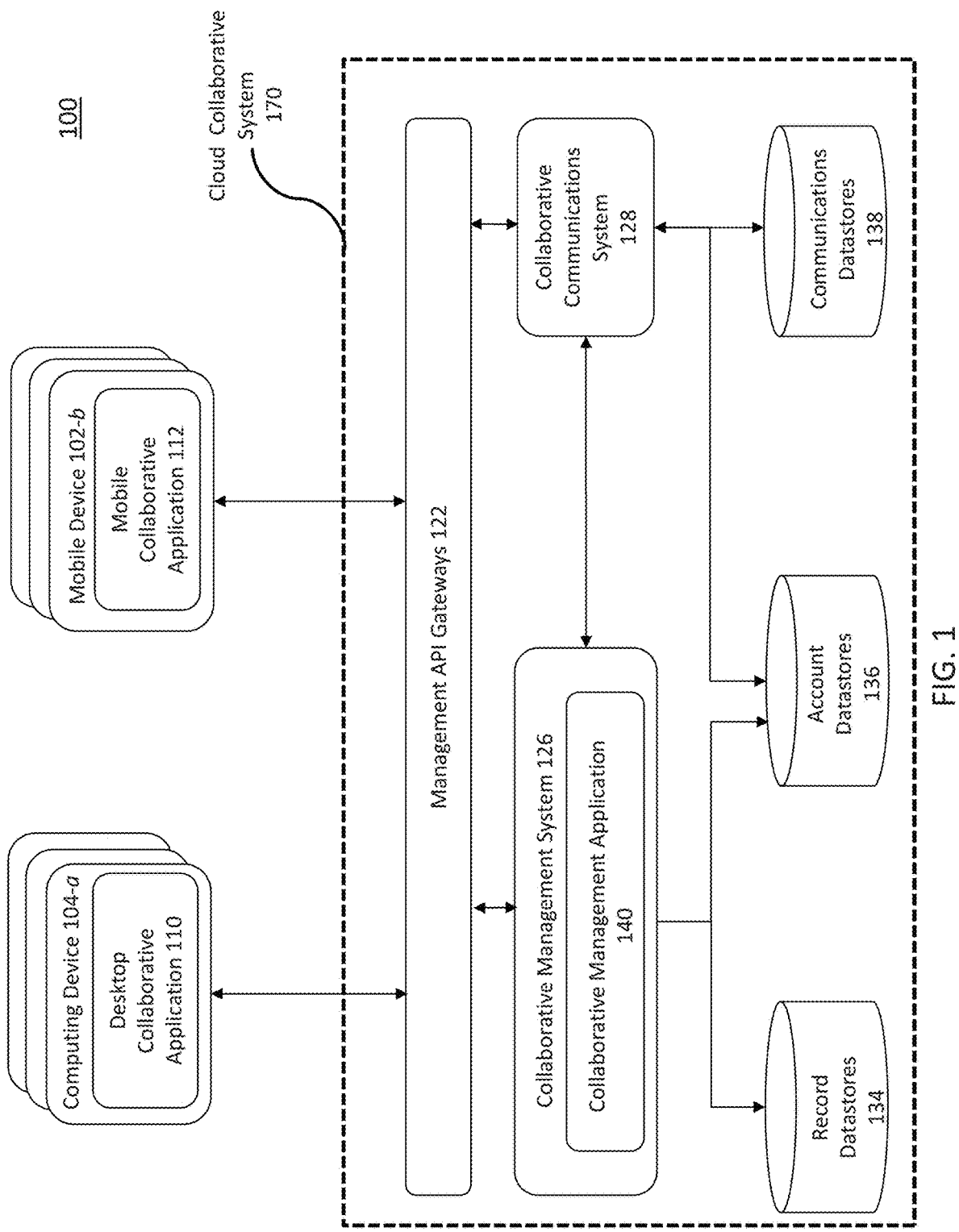
FIG. 1 is a block diagram of an architecture of a system for displaying a database record in a chat session, according to some embodiments.

FIG. 1 is a block diagram of system 100 for sharing of collaborative documents with users via instant messaging. System 100 may include one or more mobile devices 102-*b*, one or more computing devices 104-*a*, where the one or more mobile devices 102-*b*, one or more computing devices 104-*a* may be operatively and/or communicatively coupled to a cloud collaborative system 170. For example, the one or more computing devices 104-*a*, the one or more mobile devices 102-*b*, and/or the cloud collaborative system 170 of the system 100 may all be communicatively and/or operatively coupled together via wired connections, wireless connections, or a combination of wired and wireless connections as part of one or more communications networks.

In one example embodiment, the one or more communications networks may include, without limitation, an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In one embodiment, the one or more computing devices 104-a may be generally configured to execute one or more applications, which may include, without limitation, desktop collaborative application 110. For example, the one or more computing devices 104-a may be representative of desktop computing devices, server devices, virtual machines executing on desktop computing devices and/or server devices, and/or the like. An example implementation of a computing device 104-a is further illustrated and discussed with respect to FIG. 10.

In one embodiment, the one or more mobile devices 102-b may be generally configured to execute one or more mobile applications, which may include, without limitation, mobile collaborative application 112. For example, the one or more mobile devices 102-b may be representative of mobile phones, personal digital assistants, tablet computing devices, portable media players, and/or the like. An example implementation of a mobile device 102-b is further illustrated and discussed with respect to FIG. 9.

In one embodiment, the desktop collaborative application 110 (e.g., a web browser, a native application, etc.) may be configured to visually present (or otherwise display) one or more user interface (UI) views on a display device operatively coupled to the respective computing device 104-a. The one or more UI views may be generally configured to allow a user of the desktop collaborative application 110 to allow a user to chat, in real-time, with other users via their respective computing devices 104-a and/or one or more mobile devices 102-b using one or more chat UI views.

In one embodiment, the mobile collaborative application 112 (e.g., a mobile web browser, a native mobile application, etc.) configured to visually present (or otherwise display) one or more user interface (UI) views. The one or more UI views may be configured to allow a user of the mobile collaborative application 112 to chat, in real-time, with other users via their respective computing devices 104-a and/or one or more mobile devices 102-b using one or more chat UI views.

In one embodiment, the cloud collaborative system 170 may include, without limitation, a management application program interface (API) gateway 122, a collaborative management system 126, a collaborative communications system 128, record datastores 134, accounts datastores 136, and communications datastores 138. All these systems, gateways, and datastores may be communicatively and/or operatively coupled together via one or more wired connections, wireless connections, or a combination of wired and wireless connections as part of one or more communications networks as illustrated in FIG. 1.

In one embodiment, the collaborative management system 126 may be generally configured to provide one or more cloud-computing services. The one or more cloud-computing services may include, without limitation, Infrastructure as a Service (IaaS), Software as a Service (SaaS), Platform as a Service (PaaS), Storage as a Service (StaaS), Mobile "backend" as a service (MBaaS), Function as a Service (FaaS), and/or any other cloud computing services. In one embodiment, the one or more cloud-computing services may also be generally implemented by one or more virtual machines executing on one or more server devices.

In one embodiment, the one or more cloud computing services of the collaborative management system 126 may be generally configured to execute one or more distributed applications, which may include, without limitation, collaborative management application 140. In one embodiment, the collaborative management application 140 may generally be configured to communicate and operate with desktop collaborative application 110 and mobile collaborative application 112 in order to provide an interface with records datastores 134 to provide live database records in chat sessions.

In one embodiment, the collaborative management application 140 may retrieve database records from records datastores 134, format the database record into a unitary user interface element, and transmit the unitary user interface element to the collaborative communications environment.

In one embodiment, collaborative management application 140 may also allow multiple users to collaborate together, in real-time or near real-time, to design, write, implement, edit, and finalize various forms of collaborative content such as, for example, one or more collaborative documents.

In one embodiment, the collaborative communications system 128 may be generally configured to provide one or more cloud-computing services similar to those discussed with respect to the collaborative management system 126. In one embodiment, the one or more cloud-computing services may also be generally implemented by one or more virtual machines executing on one or more server devices.

Figure 2A:
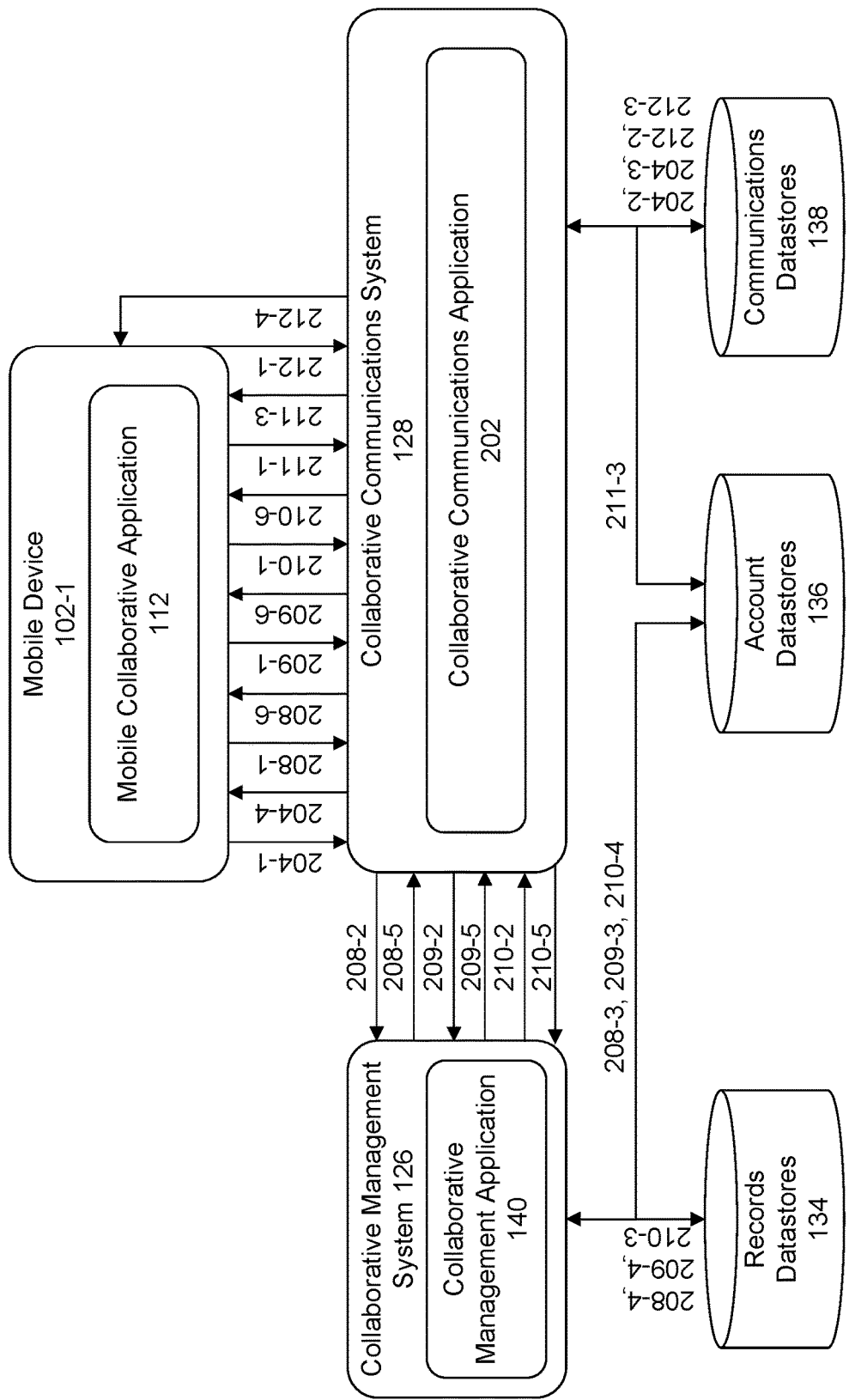
FIG. 2A is a block diagram of a data flow of a system for displaying a database record in a chat session using a mobile device, according to some embodiments.

In one embodiment, the one or more cloud computing services of the collaborative communications system 128 may be generally configured to execute one or more distributed applications, which may include, without limitation, collaborative communications application 202 (of FIG. 2A). In one embodiment, the collaborative communications application 202 may generally be configured to communicate and operate with desktop collaborative application 110 and mobile collaborative application 112 in order to provide real-time instant messaging as further discussed herein.

It may be appreciated that while collaborative management system 126 and collaborative communications system 128 are illustrated as separate systems, these two systems may be combined into a combined system. Moreover, the combined system may then be configured to provide one or more cloud-computing services and execute the one or more distributed applications including, without limitation, the collaborative management application 140 and collaborative communications application 202.

In one embodiment, the records datastores 134 may be generally configured to store database records. A non-limiting example, the dataset records may be sales account records. The sales account records may include the name of the sales account, potential sale value, past sale value, target close date, current client, past client, potential client, or the like.

In one embodiment, the account datastores 136 and may be generally configured to manage user account information associated with each user of the collaborative management system 126 and collaborative communications system 128. The user account information for each user may include, without limitation, a user identifier (e.g., user's email, unique name, etc.), the full user name (e.g., first name and last name, etc.), user password (e.g., a hashed and salted version of an alphanumeric text, etc.), user image (e.g., an image or reference to a time associated with the user), permission settings, and/or any other information associated with a user.

In one embodiment, the communications datastores 138 may be generally configured to store chat history information with respect to a chat (or instant message) history between one or more users. In one embodiment, the chat history may include information relating to all chat sessions and/or conversations between a set of users. In one embodiment, the chat history information for each chat history between a set of users may include, without limitation, chat users list that identifies the user identifier of users that are engaged in the instant message conversation, chat history identifier that uniquely identifies a chat history between the set of users, and/or collaborative communications messages list between the set of users. The chat history may include the transmissions between the set of users. For example, the transmissions may include alphanumeric text, images, emojis, stickers, GIFs, and database records.

Each of the one or more transmissions may include, without limitation, a set of transmission attributes and transmission content. In one embodiment, the set of communications message attributes may include, without limitation, transmission time attribute identifying a time the transmission was transmitted, transmission author attribute identifying a user in the set of users that sent the transmission, and/or any other transmission attributes. In one embodiment, transmission content may include, without limitation, alphanumeric text associated with the actual communications message stored in one or more text encodings and/or interpreted languages (e.g., hyper or subset thereof).

In one embodiment, the management API gateways 122 may be generally configured to provide one or more APIs to allow one or more applications (e.g., the collaborative management application 140, collaborative communications application 202, etc.) to communicate with the desktop collaborative application 110 and mobile collaborative application 112. For example, the management API gateways 122 may be configured to manage any incoming requests and provide corresponding responses between the one or more applications and the collaborative management system 126 and/or collaborative communications system 128 in accordance with one or more communication protocols.

FIG. 2A is a block diagram of a data flow 200 of a system for displaying database records in a chat session using a mobile device. In a given embodiment, a mobile collaborative application 112 of mobile device 102-1 may transmit a request 204-1 to collaborative communications system 128 initiate a chat session with one or more chat participants. For example, mobile collaborative application 112 may launch a chat platform, in response to input received from a user. As described above, the chat platform may be an application, which allows two or more chat participants to initiate a chat with each other. A chat participant may be a user of mobile device 102-1 or computing device 104-1. The two or more chat participants may transmit messages, images, emojis, GIFs, database records, or the like, to one another using the chat platform. Transmissions between the two or more users may be transmitted and received in a chat session. A chat participant may have multiple chat sessions with different chat participants using the chat platform.

A user may log in to the chat platform using a user name and password, or other authentication methods, in accordance with an embodiment. Once on the chat platform, the user (e.g., chat participant) may provide identifiers of one or more other users with whom the user would like to initiate a chat. The identifiers may be user names (such as a user name used at login), handles, employee ID numbers, student ID numbers, randomly generated identifiers, or the like. Request 204-1 may include a user identifier of the user and identifiers of each of the one or more other users.

In response to receiving request 204-1, collaborative communications application 202 may transmit request 204-2 to communications datastores 138 to determine whether there is an existing chat session between the user and the one or more other users. In response to determining, a chat session does not exist between the user and the one or more other users, communications datastores 138 may transmit response 204-3 to collaborative communications application 202. Response 204-3 may indicate that a chat session between the user and the one more other users does not exist.

In response to receiving response 204-3, collaborative communications application 202 may initiate a new chat session between the user and the one or more other users. The user and the one or more other users may be chat participants of the chat session. Therefore, that chat session may include two or more chat participants. Collaborative communications application 202 may also generate a chat session identifier with the chat session. The chat session identifier may be stored in communications datastores 138. Collaborative communications application 202 may transmit response 204-4 to mobile collaborative application 112. Response 204-4 may include an instruction to the chat platform to initiate the new chat session.

Mobile collaborative application 112 may initiate the new chat session in the chat platform between the two or more chat participants, in response to receiving response 204-4. The chat platform may include a message composer and one or more input buttons. Each of the two or more chat participants may transmit alphanumeric messages, images, GIFS, emojis, and database records in the chat session using the chat platform.

A given chat participant may use mobile collaborative application 112 to send transmissions to one another in the chat session. Each alphanumeric transmission may be encoded using one or more descriptive languages (e.g., HTML or subset thereof, etc.). The transmissions between the two or more chat participants may be stored in communications datastores 138. The transmissions may be stored in communications datastores 138 in (near) real-time. Alternatively, the transmissions may periodically be stored in communications datastores 138. The transmissions may be stored as chat history in communications datastores 138 and may be correlated to the chat session identifier.

Mobile collaborative application 112 may detect and input from the chat participant in the chat session. The input may be a selection of an input button for searching for a database record. Mobile collaborative application 112 may transmit request 208-1 to retrieve a database record to collaborative communications system 128, in response to receiving the input.

Request 208-1 may include an identifier of the chat participant that selected the input button. Collaborative communications application 202 may receive request 208-1 and may transmit request 208-2 for retrieving a list of database records associated with the chat participant. For example, the database record may be a sales record. The sales record may be associated with the chat participant if the chat participant has worked on a client for the sales record.

Collaborative management application 140 may transmit query 208-3 to accounts datastores 136 to retrieve information about the chat participant, using the identifier of the chat participant, in response to receiving the request 208-2. The information may include full name, job title, permission setting, or the like. Collaborative management application 140 may transmit query 208-4 for retrieving a list of database records from records datastores 134 associated with the chat participant using the information of the chat participant. The list of database records may include database records associated with the chat participant, of interest to the chat participant, and database records the chat participant is authorized to view.

As an example, query 208-4 may return database records associated with the chat participant based on the chat participant's information such as job title. For example, the database record may be a sales record, and the sales record may be associated with the chat participant because of his job title. Additionally, the sales record may be associated with the chat participant because the chat participant has worked on the sale corresponding to the sales record. Therefore, the chat participant's full name or identifier may be included in the sales record. Query 208-4 may return any sales record that includes the chat participant's full name or identifier. Furthermore, query 208-4 may return database records that the chat participant is authorized to view, using the permission setting of the chat participant. Additionally, query 208-4 may also retrieve database records that may be of interest to the chat participant. For example, if the database record is a sales record, including a field for potential sales value above a threshold amount, the sales record may be of interest to the chat participant. As such, query 208-4 may also return the sales record.

Collaborative management application 140 may generate response 208-5. The response may include the list of database records. Collaborative management application 140 may transmit response 208-5 to collaborative communications application 202. Collaborative communications application 202 may generate response 208-6, in response to receiving response 208-5. Response 208-6 may include an instruction to launch a search window, including the list of database records. Collaborative communications application 202 may transmit response 208-6 to mobile collaborative application 112.

Mobile collaborative application 112 may launch the search window, including the list of database records or display the list of database records below the message composer, in response to receiving response 208-6. The search window may include an input field. The input field may receive a string for searching for database records. The list of database records may include a name and icon of the database record.

Mobile collaborative application 112 may detect a chat participant inputting a string in the input field of the search window. The string may be tied to a request for searching database records matching the string. The string may include alphanumeric characters. Mobile collaborative application 112 may generate request 209-1, in response to detecting input of the string. As an example, request 209-1 may be generated in response to receiving the first character of the string. Request 209-1 may be for searching for and retrieving all database records that match the string. Request 209-1 may include the string and identifier of the chat participant.

Mobile collaborative application 112 may transmit request 209-1 to collaborative communications application 202. Collaborative communications application 202 may transmit request 209-2 to collaborative management application 140 to retrieve all the database records that match the string. Request 209-2 may include the string and the identifier of the chat participant.

Collaborative management application 140 may transmit a query 209-3 to accounts datastores 136 to retrieve information about the chat participant, using the identifier, in response to receiving request 209-2. Query 209-3 may include information about the chat participant, including the permission setting. Collaborative management application 140 may transmit query 209-4 to records datastores 134 to retrieve any database record with a database name field that matches the string. Query 209-4 may return all database records that include a name field that matches the string and that are allowed to be viewed by the chat participant based on the permission setting. Collaborative management application 140 may generate response 209-5 and transmit response 209-5 to collaborative communications application 202. Response 209-5 may include the search results, including the database records retrieved by query 208-4.

Collaborative communications application 202 may receive response 209-5 and generate response 209-6. Response 209-6 may include an instruction to display the search results, including the database records included in response 209-5 in the search window. Mobile collaborative application 112 may display the search results, including the database records in the search window.

The search for the database records may be a live search. That is, the chat participant may continuously modify the string in the input field. In response to modifying the string, request 209-1, request 209-2 may be updated with the modified string. Furthermore, query 209-4 may return updated search results, including database records matching the modified string. Response 209-5 and response 209-6 may be updated to include the updated search results. Mobile collaborative application 112 may display the updated search results, including the database records matching the modified string, in response to receiving response 209-6. In view of the above, request 209-1, request 209-2, query 209-4, response 209-5, and response 209-6 may be updated in (near) real-time, in response to modification of the string. Modification of the string may include the deletion or addition of a character.

Mobile collaborative application 112 may detect a selection of a database record in the search results. The selection may be tied to a request to include the selected database record in the chat session. Mobile collaborative application 112 may generate request 210-1 to retrieve a subset of fields of the selected database record. Mobile collaborative application 112 may transmit request 210-1 to collaborative communications application 202. Request 210-1 may include a database record identifier (e.g., name, unique ID, or the like) and identifiers of the two or more chat participants.

Collaborative communications application 202 may receive request 210-1 and may transmit request 210-2 for retrieving the database record to collaborative management system 126. Request 210-2 may include the database record identifier and the identifiers of the two or more chat participants.

Collaborative management application 140 may transmit query 210-3 to retrieve the database record from records datastores 134 using the database record identifier, in response to collaborative management system 126 receiving the request 210-2. Collaborative management application 140 may format the retrieved database record into a unitary user interface element, including a subset of the fields of the database record. For example, collaborative management application 140 may determine that out of a given amount of fields in a database record, a subset of the fields are to be rendered in the chat session, based on the chat session settings or preferences.

Figure 5:
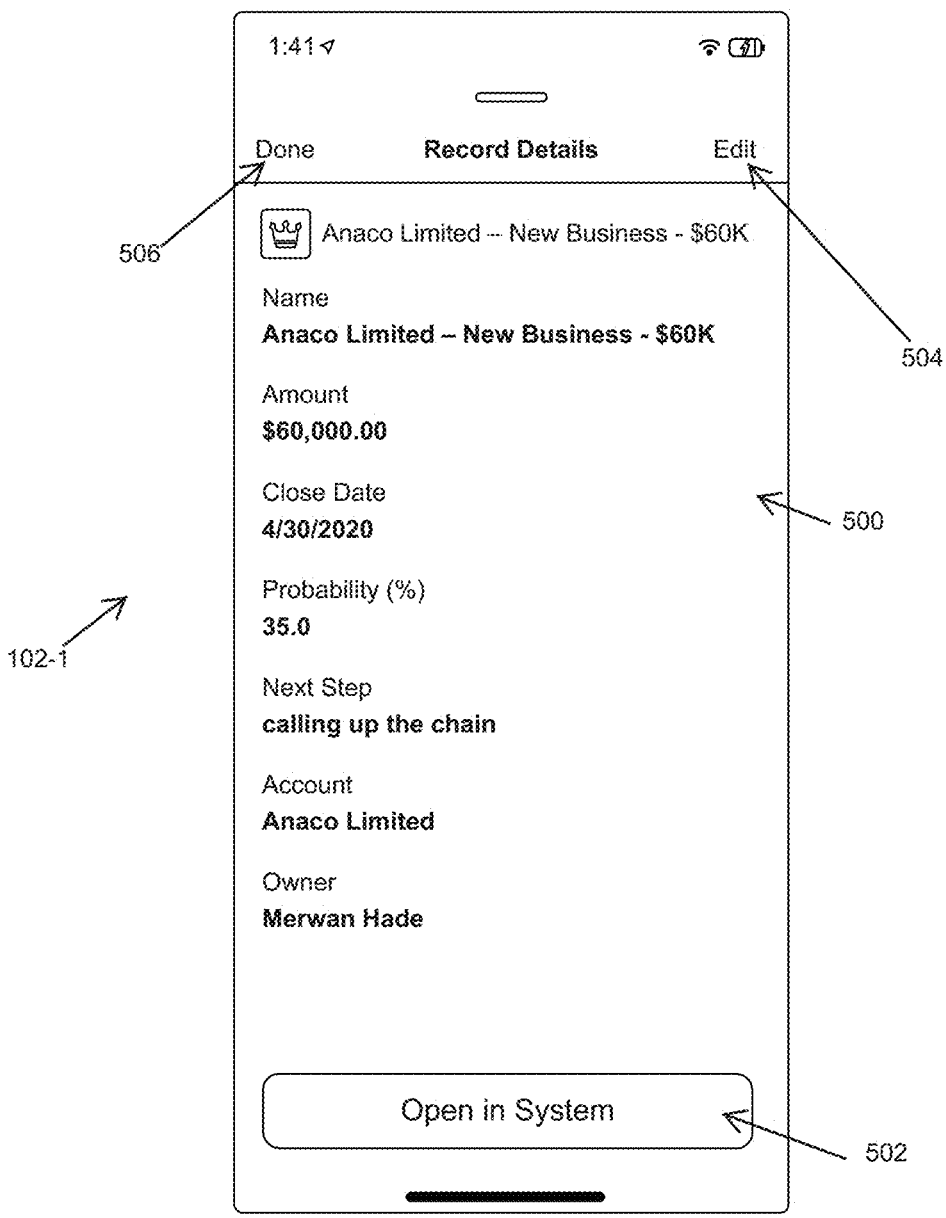
FIG. 5 is a user interface of an expanded view of a database record, according to some embodiments.

Collaborative management application 140 may encode the unitary user interface element with the database record identifier. Collaborative management application 140 may encode the unitary user interface element with a link to a screen for an expanded view of the database record, as shown in FIG. 5. The link may be a URL/URI.

The unitary user interface element may also include an icon (e.g., a small image). The collaborative management application 140 may retrieve an icon for the database record based on a value of a field of the database record. For example, the database record may be a sales record. The sales record may be an existing client, past client, or potential client. In this regard, the icon may represent the type of client.

Collaborative management application 140 may also transmit query 210-4 to retrieve a permission setting for the chat participants using the identifiers of the two or more chat participants, from account datastores 136. The permission setting may indicate which database record fields a given chat participant is allowed to view. For example, one chat participant in the chat session may be allowed to view all the fields of the database record. Conversely, a different chat participant of the chat may only be allowed to view a portion of the database fields. Collaborative management application 140 may determine out of the subset of fields in the unitary user interface element, which fields a given chat participant may view, based on the permission settings. In this regard, collaborative management application 140 may remove a field from the subset of fields in the unitary user interface element if a given chat participant is not allowed to view the field. In this regard, collaborative management application 140 may generate different unitary user interface elements for each chat participant in the chat session. The different unitary user interface elements may be included in response 210-5. Collaborative management application 140 may transmit response 210-5 to collaborative communication system 128.

Collaborative management application 202 may receive response 210-5. Response 210-5 may include the different unitary user interface elements for chat participants in the chat session. Collaborative management application 202 may generate response 210-6. Response 210-6 may include a unitary user interface element for a given chat participant. As indicated above, a unitary user interface element may be specific for a given chat participant based on the chat participant's permission setting. A different response 210-6 may be generated for different chat participants, including their respective unitary user interface elements. Collaborative management application 202 may transmit response 210-6 to mobile collaborative application 112.

Mobile collaborative application 112 may display the unitary user interface element corresponding to the database record in the message composer of the chat platform. In response to receiving a selection of a submit button, mobile collaborative application 112 may include the unitary user interface element in the chat session. The unitary user interface element may include a subset of fields of the database record, which the given chat participant is authorized to view.

As indicated above, the unitary user interface element may be encoded with a database record identifier and link to an expanded view of the database record. In response to a chat participant selecting the unitary user interface element, an expanded view of the database record may be displayed. The expanded view of the database record may be seen in FIG. 5.

In some embodiments, a user may type a message in the message composer while the message composer is populated with the unitary user interface element. The message and unitary user interface element may be transmitted together in response to the selection of the submit button.

In some embodiments, a user may want to direct a message of the database record to a particular chat participant. The chat participant may or may not be included in the chat session. Once the message composer is populated with the database record, the message composer may receive input of the predetermined character (e.g., '@'). Mobile collaborative application 112 may detect the input of the predetermined character and generate request 211-1 for retrieving a list of chat participants (e.g., users). Mobile collaborative application 112 may transmit request 211-1 to collaborative communications application 202. Request 211-1 may include the identifier of the chat participant and the other chat participants in the chat session.

Collaborative communications application 202 may transmit query 211-2 to accounts datastores to retrieve the usernames of the other chat participants in the chat session. Collaborative communications application may encode the username of the other chat participants in the chat session with an identifier of the chat participant and a link to the chat participant's information in accounts datastores 136. Collaborative communications application 202 may generate and transmit response 211-3 to mobile collaborative application 112. Response 211-3 may include the encoded usernames of the other chat participants. Response 211-3 may also include an instruction to display the encoded usernames underneath the message composer.

Mobile collaborative application 112 may render the encoded usernames underneath the message composer. Mobile collaborative application 112 may detect a selection of one of the usernames. In response to detecting the selection of one of the usernames, mobile collaborative application 112 may include the encoded username in the message composer. The message composer may include the unitary user interface element and the encoded username. Mobile collaborative application 112 may include the database record and the encoded username in the chat session in response to the selection of the submit button.

In some embodiments, a chat participant may want to transmit the unitary user interface element to another chat participant in a private chat session. In this case, in response to receiving the selection of the submit button, mobile collaborative application 112 may generate request 212-1 for initiating a new chat session, including the chat participant and the other chat participant corresponding to the encoded username in the message composer. Request 212-1 may include the identifiers of the chat participant and the other chat participant.

Collaborative communications application 202 may transmit request 212-2 to communications datastores 138 to determine whether there is an existing chat session between chat participant and the other chat participant. In response to determining, a chat session does not exist between the chat participant and the other chat participant, communications datastores 138 may transmit response 212-3 to collaborative communications application 202. Response 212-3 may indicate that a chat session between the chat participant and the other chat participant does not exist.

In response to receiving response 212-3, collaborative communications application 202 may initiate a new chat session between the chat participant and the other chat participant. Collaborative communications application 202 may also generate a chat session identifier with the chat session. The chat session identifier may be stored in communications datastores 138. Collaborative communications application 202 may transmit response 204-4 to mobile collaborative application 112. Response 212-4 may include an instruction to the chat platform to initiate the new chat session and to include the unitary user interface element and the encoded username.

Mobile collaborative application 112 may initiate the new chat session in the chat platform between the chat participant and the other chat participant, in response receiving response 212-4. The chat session may include the unitary user interface element and the encoded username.

Figure 2B:
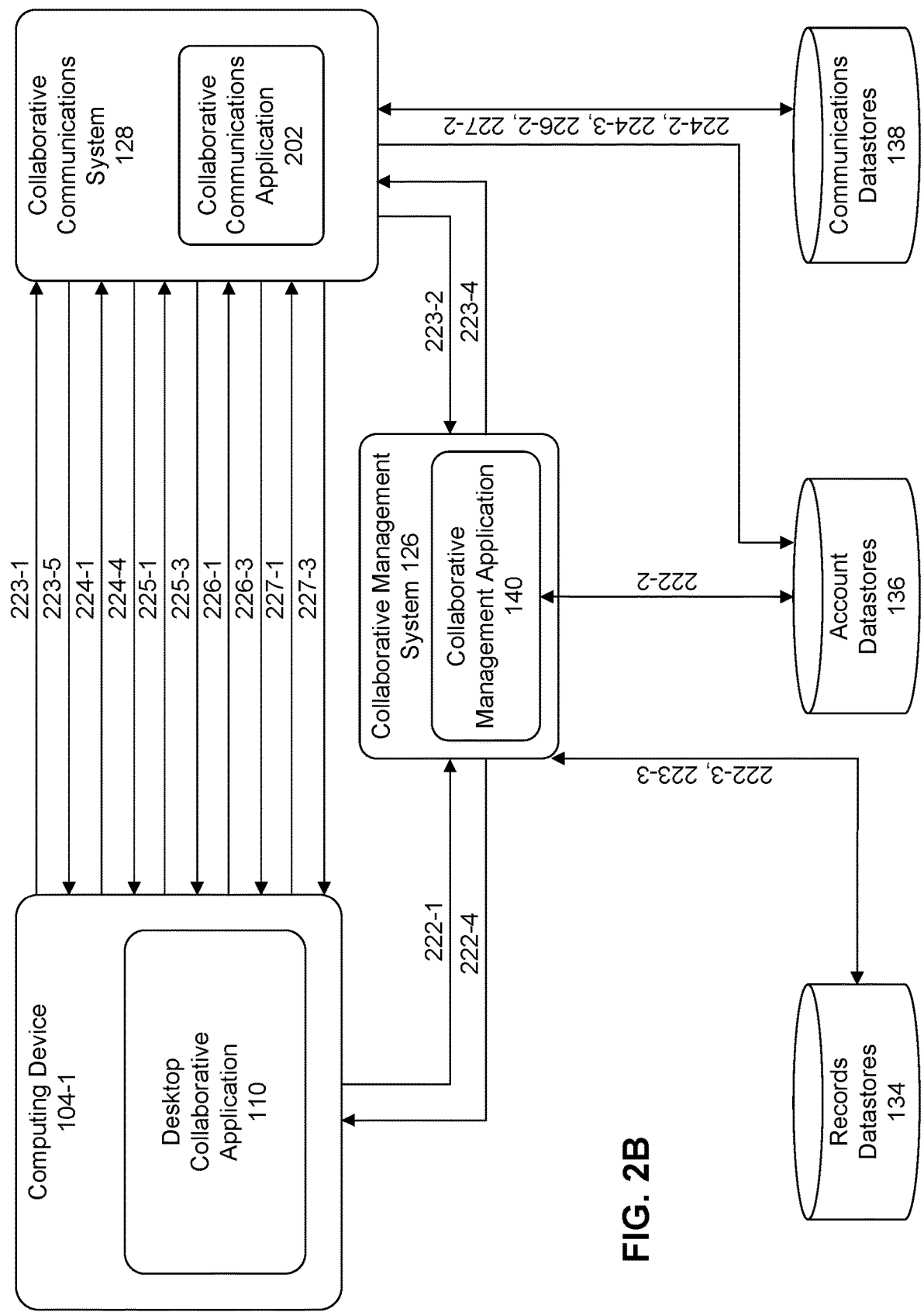
FIG. 2B is a block diagram of a data flow of a system for displaying a database record in a chat session using a computing device, according to some embodiments.

FIG. 2B is a block diagram of a data flow 220 of a system for displaying database records in a chat session using a computing device. Computing device 104-1 may include desktop collaborative application 110. Desktop collaborative application 110 may provide an interface for accessing complete records from records datastores 134. Therefore, users can use the desktop collaborative application 110 to access, add, modify, and delete records from records datastores 134. Desktop collaborative application 110 may also provide a chat platform for users to communicate with each other. Users can share messages, images, GIFs, and emojis using the chat platform. Furthermore, users may share database records directly from the records datastores 134 using the chat platform.

For example, a user may attempt to access a database record using desktop collaborative application 110. The desktop collaborative application 110 may transmit a request 222-1 to retrieve the database record to collaborative management application 140. The request may include the user's identifier and the database record identifier. Collaborative management application 140 may transmit a query 222-2 to accounts datastores 136 to retrieve a permission setting for the user, using the user's identifier. Collaborative management application 140 may transmit a query 222-3 to retrieve the data record from records datastores 134 using the database record identifier and the user's permission setting. Query 222-3 may return the database record to the desktop collaborative application based on the user's permission setting. For example, query 222-3 may not return the database record because the permission setting does not authorize the user to view the database record. Alternatively, query 222-3 may return a portion of the database record because the permission setting allows the user to view a portion of the database record. Furthermore, query 222-3 may return the complete database record because the permission setting allows the user to view the complete database record.

Collaborative management application 140 may transmit response 222-4 to desktop collaborative application 110. Response 222-4 may include the result of query 222-3. The result may include a message that the user is not authorized to view the database record, a portion of the database record, or the complete database record. Desktop collaborative application 110 may display the message, portion of the database record, or the complete database record for the user.

Desktop collaborative application 110 may receive a selection of a share in chat button from a user. Desktop collaborative application 110 can generate a request 223-1 to retrieve the database record for sharing in a chat session. Request 223-1 may be a request to share a subset of the fields of the entire database record or a subset of fields of an attribute of the database record. For example, an attribute may include a point of contact in the database record. Request 223-1 may be tied to transmitting contact information for the point of contact. Desktop collaborative application 110 may generate request 223-1 based on the page being viewed by the user. Therefore, if the user is viewing the entire database record and selects the share in chat button, desktop collaborative application 110 may generate request 223-1 for retrieving the subset of fields for the database record. Alternatively, if the user is viewing the point of contact information for the database record and selects the share in chat button, desktop collaborative application 110 may generate request 223-1 for retrieving the subset of fields for the point of contact.

Desktop collaborative application 110 may transmit request 223-1 to collaborative communication application 202. Request 223-1 can include the database record identifier.

Collaborative communications application 202 may receive request 223-1 and may transmit request 223-2 for retrieving the database record to collaborative management system 126. Request 223-2 may include the database record identifier.

Collaborative management application 140 may transmit query 223-3 to retrieve the database record from records datastores 134 using the database record identifier, in response to collaborative management system 126 receiving the request 223-2. Collaborative management application 140 may format the retrieved database record into a unitary user interface element, including a subset of the fields of the database record. For example, collaborative management application 140 may determine that out of a given amount of fields in a database record, a subset of the fields are to be rendered in the chat session, based on the chat session settings or preferences.

Collaborative management application 140 may encode the unitary user interface element with the database record identifier. Collaborative management application 140 may encode the unitary user interface element with a link to the complete record of the database record.

The unitary user interface element may also include an icon (e.g., a small image). The collaborative management application 140 may retrieve an icon for the database record based on a value of a field of the database record. For example, the database record may be a sales record. The sales record may be an existing client, past client, or potential client. In this regard, the icon may represent the type of client.

Collaborative management application 140 may transmit response 223-4 to collaborative communications application 202. Response 223-4 can include the unitary user interface element. Collaborative communications application 202 can generate and transmit response 223-5 to desktop collaboration application 110. Response 223-5 can include the unitary user interface element and instruction to open a chat window.

Desktop collaboration application 110 may generate a new chat window of the chat platform. The message composer may be populated with the unitary user interface element. The user may input string corresponding to a name of an existing chat session or one or more usernames of other users in a recipient field of the chat window. Desktop collaboration application 110 may generate and transmit a request 224-1 to collaborative communications application 202. Request 224-1 can include the string corresponding to the name of an existing chat session or one or more other users.

Collaborative communications application 202 may transmit a request 224-2 to communications datastores 138 determine whether a chat session with a name or one or more usernames that matches the string exists in the communications datastores 138. Communications datastores 138 may transmit a list of all the existing chat sessions that match the string in response 224-3. Collaborative communication application 202 may transmit the list of existing chat sessions that match the string to desktop collaboration application 110, in response 224-4.

Desktop collaboration application 110 may display the list of existing chat sessions in the chat window, with respect to the recipient field. The list of chat sessions can include the names of a chat session or usernames of chat participants in the existing chat sessions. Each of the chat sessions in the list may be encoded with an identifier of the chat session The search may be a live search. The search for the existing chat session may be updated in (near) real-time as the user modifies the string corresponding to the name of the existing chat session or usernames of one or more other users. Therefore, request 224-1 and 224-2 may be continuously updated in response to modification of the string. Furthermore, communications datastores 138 can transmit the updated list of chat sessions based on the modified string, in response 224-3. Collaborative communications application 202 may also transmit the updated list of chat sessions in response 224-4. As a result, the list of chat sessions displayed by the desktop collaborative application may continuously be updated as the string is modified.

Desktop collaboration application 110 may receive a selection of one of the existing chat session from the list. Desktop collaboration application 110 may transmit request 225-1 to collaborative communication application 202 to retrieve the selected chat session. Request 225-1 can include the identifier of the chat session. Collaborative communication application 202 may transmit a query 225-2 to communications datastores 138 to retrieve the chat session, using the identifier of the chat session. Communications datastores 138 can return the chat session to collaborative communications application 202. The chat session can include a chat history between the user and one or more other users. The user or one or more other users may be chat participants. The chat history can include transmissions between the chat participants. The transmissions can include messages, images, emoji's, GIFs, and database records.

Collaborative communications application 202 may transmit response 225-3 to desktop collaborative application 110. Response 225-3 may include the chat session. Desktop collaborative application 110 can display the chat session in the chat window.

As indicated above, the message composer may be populated with the unitary user interface element. A user can select the submit button to include the unitary user interface element in the chat session.

In some embodiments, the user can initiate a new chat session with one more other users in the chat platform, as described with respect to FIG. 2A.

Desktop collaboration application 110 can receive a selection of a chat button from the user. Desktop collaboration application 110 can generate and transmit a request 226-1 to the collaborative communications application 202 for retrieving all existing chat sessions, including the user. Request 226-1 may include the user's identifier. Collaborative communications application 202 can transmit a query 226-2 to the communications datastores 138 to retrieve all chat sessions, including the user, using the user's identifier. Communications datastores 138 may return a list of chat sessions, including the user to collaborative communication application 202.

Collaborative communication application 202 can generate response 226-3, including the list of chat sessions, including the user. The list of chat sessions can include the names of the chat sessions or usernames of the one or more users in the chat session. Each chat session in the list may be encoded with an identifier of the chat session. Collaborative communication application 202 may transmit response 226-3.

Desktop collaborative application 110 may display the list of chat sessions with respect to the chat button. Desktop collaborative application 110 may receive a selection of a chat session from the list. Desktop collaboration application 110 may transmit request 227-1 to collaborative communication application 202 to retrieve the selected chat session. Request 227-1 can include the identifier of the chat session. Collaborative communication application 202 may transmit a query 227-2 to communications datastores 138 to retrieve the chat session, using the identifier of the chat session. Communications datastores 138 can return the chat session to collaborative communications application 202.

Collaborative communications application 202 may transmit response 227-3 to desktop collaborative application 110. Response 227-3 may include the chat session and instruction to open a chat window, including the chat session. The chat session may include the chat history between two or more chat participants (e.g., the user and one or more other users). The chat history may include a unitary user interface element corresponding to a database record.

Desktop collaboration application 110 can receive a selection of the unitary user interface element by the user. As indicated above, the unitary user interface element may be encoded with a link to the complete database record. Desktop collaboration application 110 may display the complete database record in response selection of the unitary user interface element.

Figure 3:
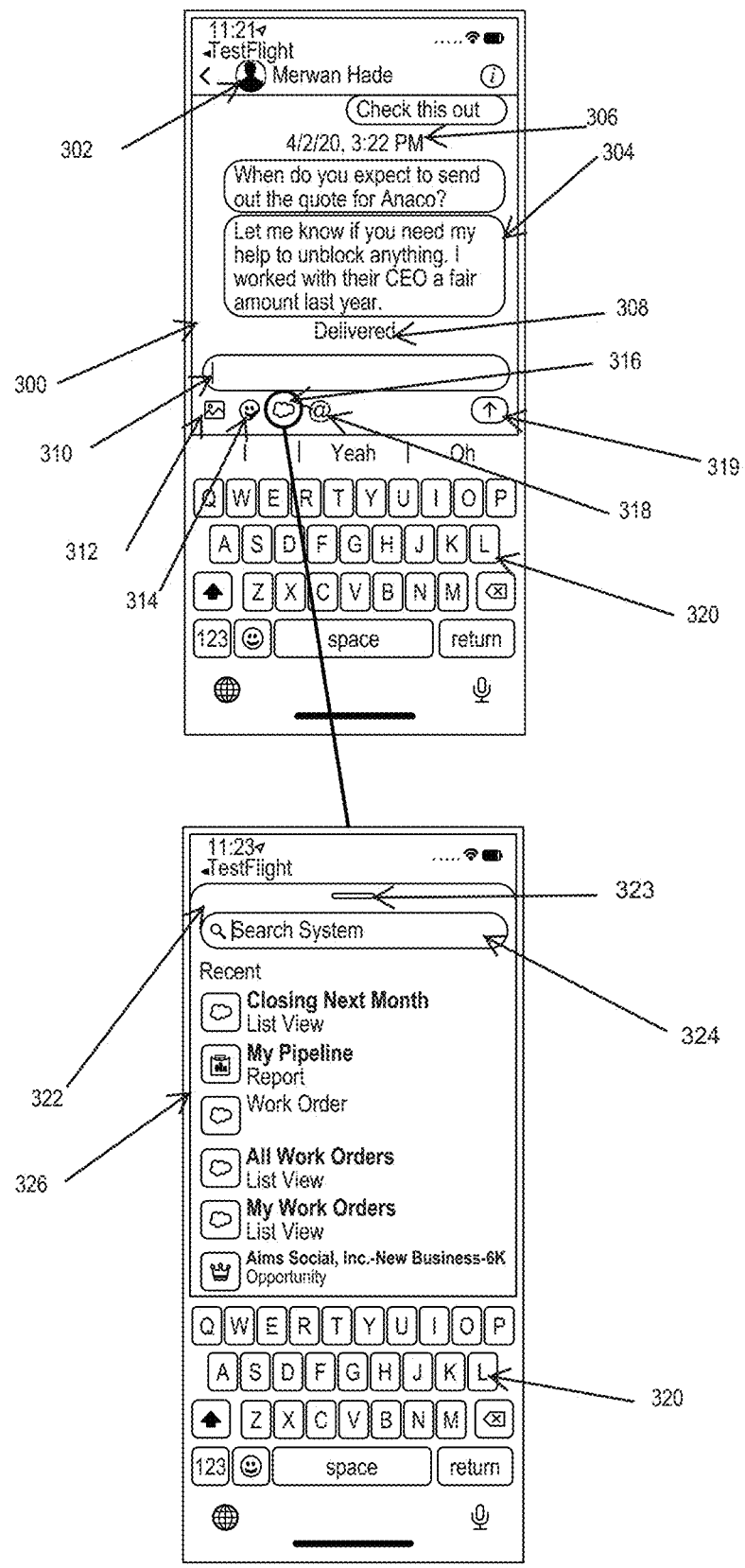
FIG. 3 is a user interface of a chat platform including a chat session and a search window, according to some embodiments.

FIG. 3 is a user interface of a chat platform including a chat session and a search window, according to some embodiments. In a given embodiment, mobile device 102-1 may render a user interface of a chat platform executing on a mobile collaborative application. The chat platform may include chat session 300. The chat session may be between the user of mobile device 102-1 and another chat participant. A name 302 of the chat participant may be displayed at the top of chat session 300. In the event, multiple chat participants are included in the chat session, the chat session may include a group name or the names of each of the chat participants. The names may be the actual names of the chat participants or user identifiers (e.g., screen names).

Chat session 300 may include transmissions between the chat participants, including message 304. Chat session 300 may also include a date and time element 306, indicating the date and time the messages were transmitted. Furthermore, chat session 300 may also include delivery confirmation element 308, indicating that the messages were delivered.

The chat platform may include a message composer 310 and input buttons 312-318. Message composer 310 may be used to compose and transmit messages in chat session 300. Button 312 may be selected to transmit an image in chat session 300. Button 314 may be selected to transmit an emoji or GIFs. Button 316 may be selected to search for and transmit database records. Button 318 may be selected to initiate a search for a user or database record. In response to selecting button 318, the '@' key may be input in message composer 310, and a list of chat participants may be displayed. A chat participant may search for a specific chat participant by typing an alphanumeric string after the '@' key. A chat participant may use keyboard 320 to type messages in message composer 310 and transmit the messages in chat session 300.

In response to selecting button 316, search window 322 may be launched. Search window 322 may be overlaid on the chat session. Search window 322 may be collapsed by pulling down tab 323. Search window 322 may include input field 324 and a list of database records 326. As indicated with respect to FIG. 2, the list of database records may include database records associated with the chat participant or database records that may be of interest to the chat participant.

The list of database records may include a name of the database record and an icon of the database record. Each of the names and icons of the database records may be selectable. In response to selecting any of the database records, a request may be transmitted to retrieve a unitary user interface element corresponding to the database record.

A user may search for database records by inputting a string in input field 324 using keyboard 320. The search may be a live search. Therefore, the search may be updated in (near) real-time as the user modifies the string. In this regard, in response to the user inputting the letter "a" in input field 324, a list of database records whose name start with the letter "a" may be displayed. If the user adds the letters "bc," and the string is now "abc," the list of database records is updated to all database records whose name start with the letters "abc." If the user deletes the letter b from the string, and the string is now "ac," the list of database records is updated to all database records whose name start with "ac."

Figure 4:
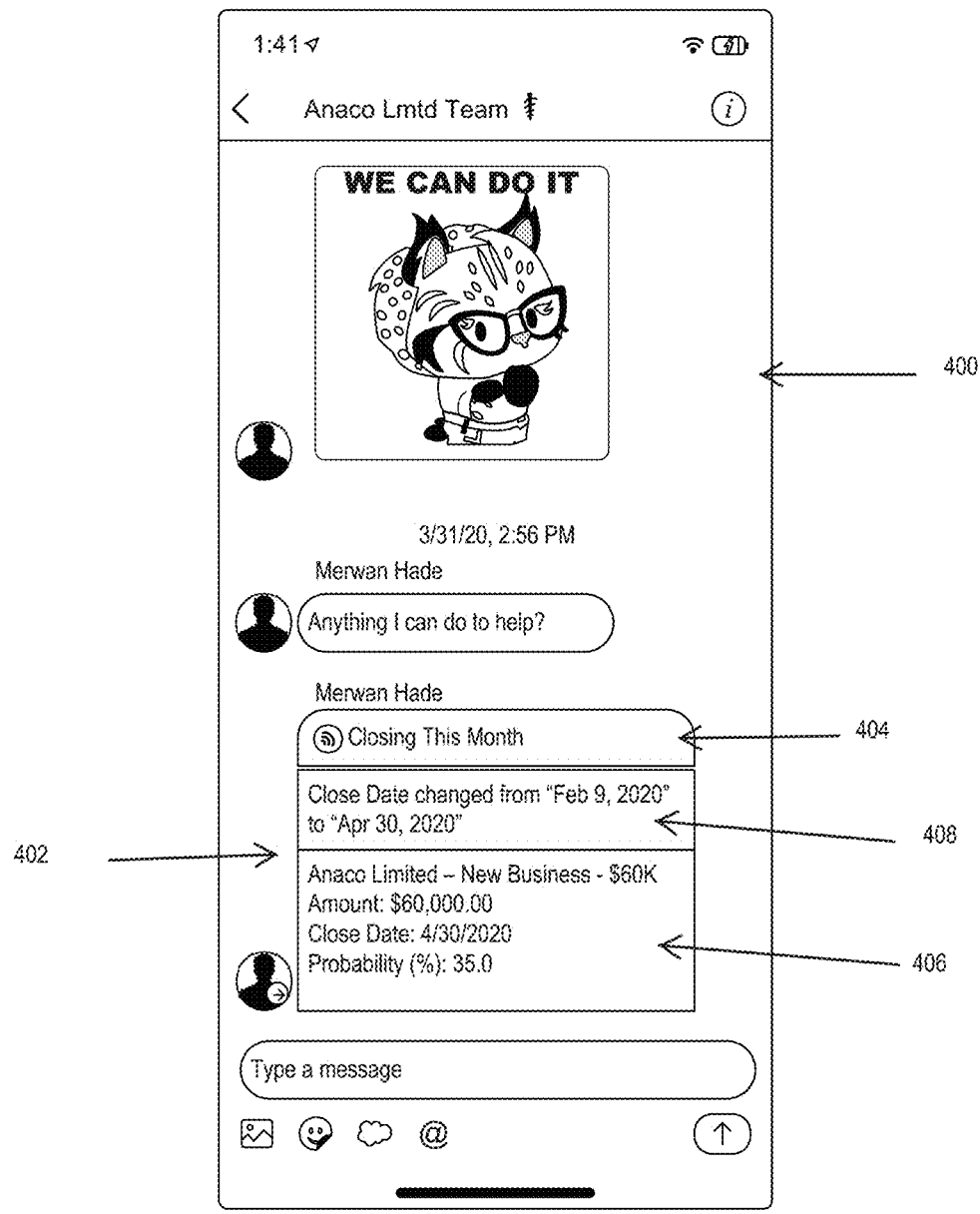
FIG. 4 is a user interface of a chat session including a database record, according to some embodiments.

FIG. 4 is a user interface of a chat platform including a chat session including a database record, according to some embodiments. Chat session 400 may include transmissions between two or more chat participants. The transmissions may include images, text messages, and database records.

A database record may be included as a unitary user interface element 402 in response to a chat participant selecting the database record from a list of database records, as shown in FIG. 3. Unitary user interface element 402 may include a status element 404 indicating the status of the database record. For example, the database record may be a sales record. The status may indicate that the sale is closing this month. Unitary user interface element 402 may also include a subset of fields 406 and a message element 408. The message element 408 may indicate if any of the fields have been updated.

FIG. 5 is a user interface of an expanded view of a database record, according to some embodiments. A user may view an expanded view 500 of the database record (e.g., the database record corresponding to unitary user interface element 402, as shown in FIG. 4) in response to a user selecting the database record in the chat session. Mobile device 102-1 may render a user interface of a chat platform executing on a mobile collaborative application. The user interface may include the expanded view 500 of the database record. The expanded view 500 may include additional fields not included in the unitary user interface element of the database record included in the chat session. The expanded view 50 may also include button 502. Button 502 may be selected to view the database record in the backend system.

A user may edit the fields of the database record by selecting edit selection 504. In response to selecting edit selection 504, the mobile collaborative application may transmit a request to the collaborative communications system. The request may include the identifier of the user who selected edit selection 504. The collaborative communications system may forward the request to the collaborative management system. Collaborative management application may retrieve the permission settings of the user using the identifier. The permissions settings may indicate which fields of the database record the user may edit. The collaborative management application may transmit permission settings to the collaborative communications system. Collaborative communications application may make the fields that the user is allowed to edit in the expanded view 500, editable for the user. The user's edits may be stored in the records datastores. The user may return to the chat session in response to selecting the "Done" selection 506.

Figure 6:
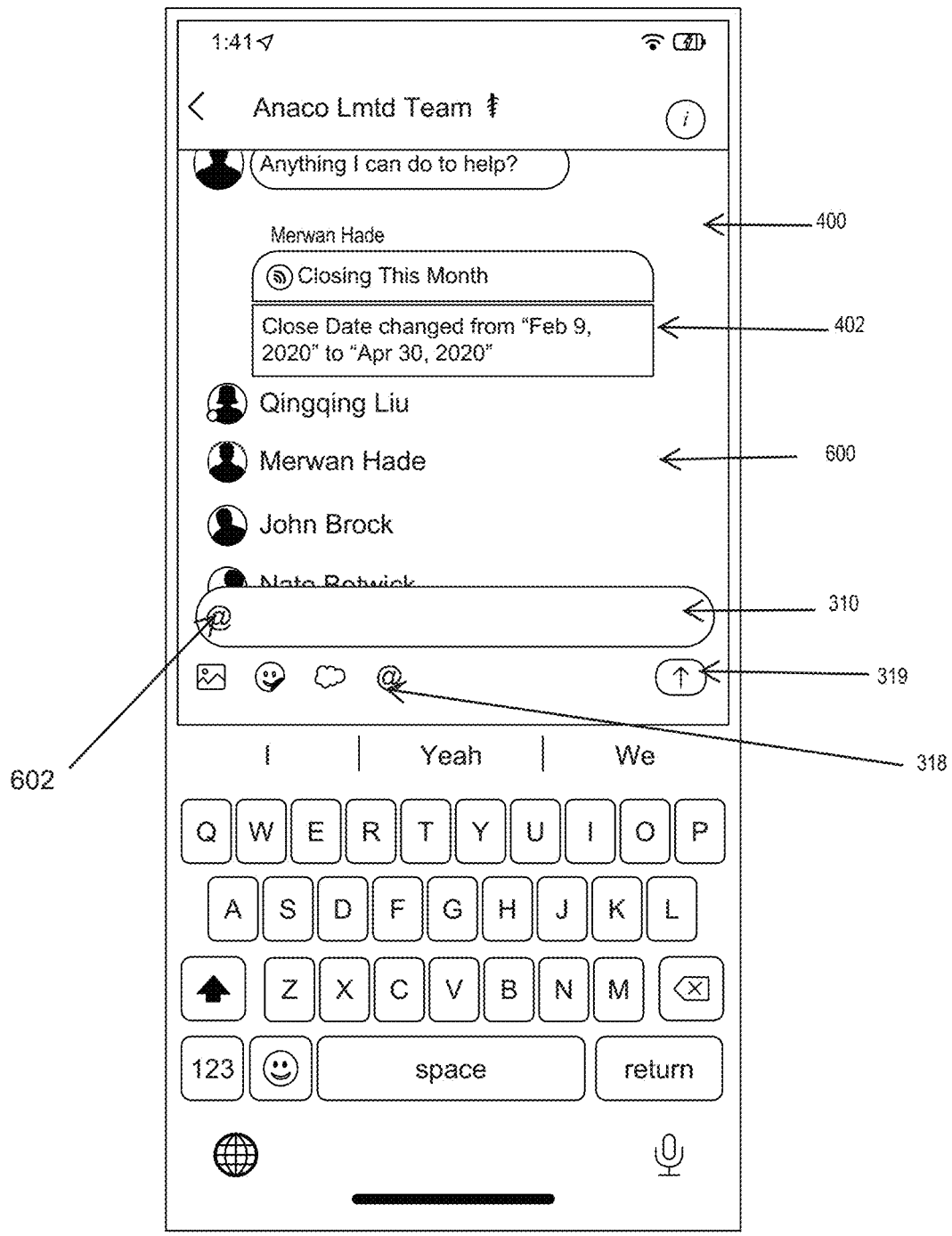
FIG. 6 is a user interface of a chat session including a list of chat participants, according to some embodiments.

FIG. 6 is a user interface of a chat platform including a chat session including a list of chat participants, according to some embodiments. Chat session 400 may include unitary user interface element 402 representing a database record. Furthermore, a chat participant may want to direct a message to another chat participant. The message may include unitary user interface element 402. A chat participant may select input button 318. In response to selecting input button 318, the '@' character 602 may be populated in message composer 310. Furthermore, a list of chat participants 600 may be displayed with respect to message composer 310. The list of chat participants 600 may be part of chat session 400. Alternatively, the list of chat participants 600 may include chat participants, not part of chat session 400.

The chat participant may input a string to search for chat participants. The search may be a live search. Therefore, the search may be updated in (near) real-time as the user modifies the string. In this regard, in response to the user inputting the letter "x" in message composer, a list of chat participants whose name start with the letter "a" may be displayed. If the chat participant adds the letters "yz," and the string is now "xyz," the list of chat participants is updated to all chat participants whose name start with the letters "xyz." If the chat participant deletes the letter 'y' from the string, and the string is now "xz," the list of chat participants is updated to all chat participants whose name start with "xz."

The chat participant may select another chat participant from list of chat participants 600. In response to selecting the chat participant, an encoded username of the chat participant may be included in message composer 310. The username may be encoded with a link and an identifier of the chat participant. The link may be to a pre-generated request for navigating to any other mention of the username in chat session 400.

The chat participant may submit the message directed to the other chat participant by selecting submit button 319. The message directed to the chat participant may include the message (e.g., text, image, GIF, emoji, or unitary user interface element representing a database record) and the encoded username of the other chat participant preceded by the '@' character. The message and the encoded username of the other chat participant may be included in chat session 400. The other chat participant may receive an alert that a message directed to the other chat participant is included in chat session 400. The chat participants of chat session 400 may navigate to any mention of the other chat participant by selecting the encoded username included in chat session 400.

In some embodiments, in response to a chat participant transmitting a message directed to another chat participant, a private chat session may be generated, including the chat participant and the other chat participant. The private chat session may include the message and the encoded username of the other chat participant.

Figure 7:
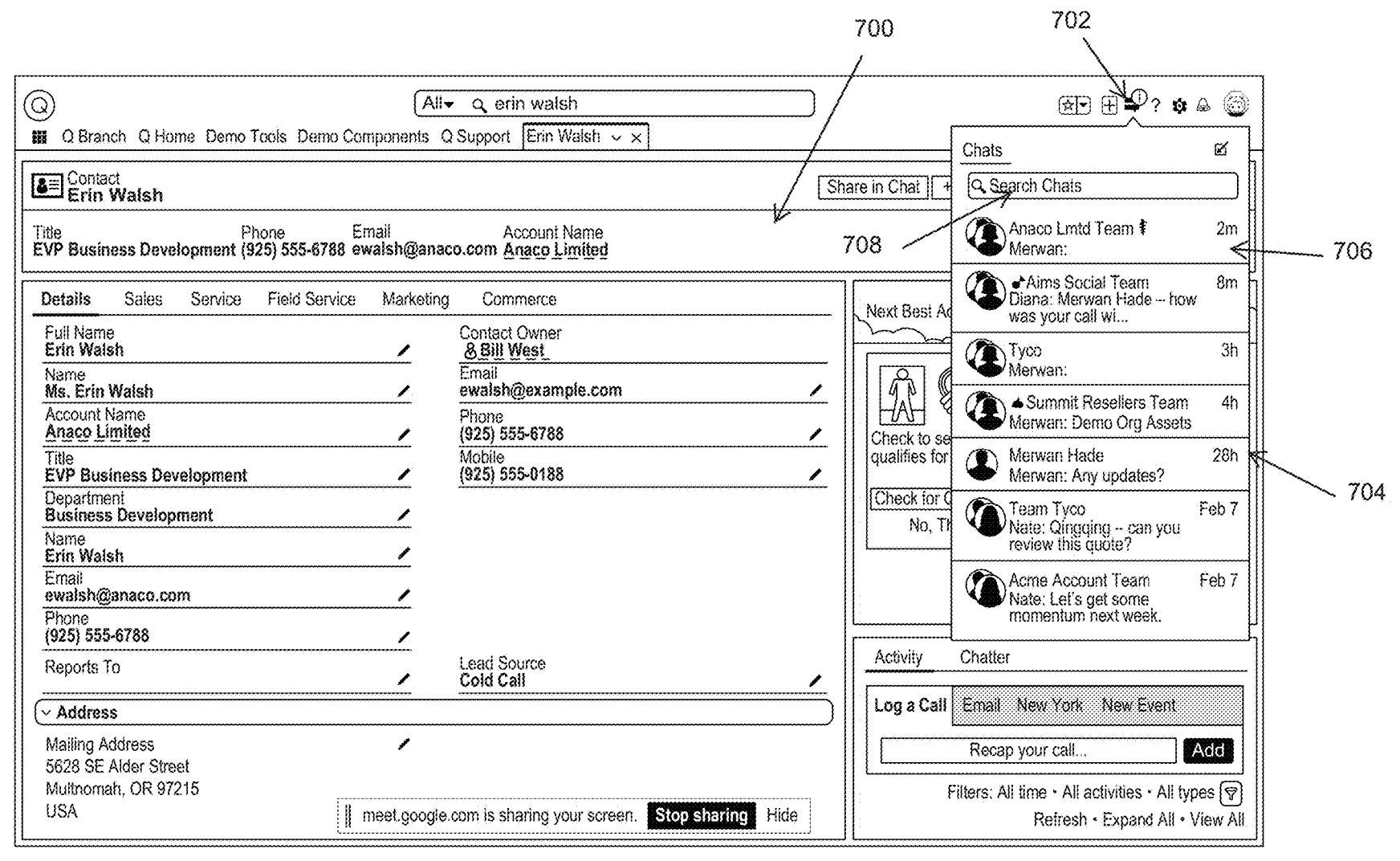

FIG. 7 is a block diagram of an interface of the desktop collaborative application, according to some embodiments. Interface 700 of the desktop collaborative application may include a complete database record, including all the data fields of the database record a user of the desktop collaborative application is authorized to view. Interface 700 can be used to view, create, modify, and delete database records based on a user's permission setting.

The desktop collaborative application may also implement a chat platform. Interface 700 can include chat button 702. In response to selecting chat button 702, a list 704 of existing chat sessions may be displayed with respect to chat button 702. List 704 can include names of existing chat sessions or usernames of one or participants of the chat session. List 704 may also include a search field 708. Search field 708 may be used to search the existing chat sessions between the user of the desktop collaborative application and other users. The user of the desktop collaborative application may select a chat session 706 to open the chat session.

Figure 8:
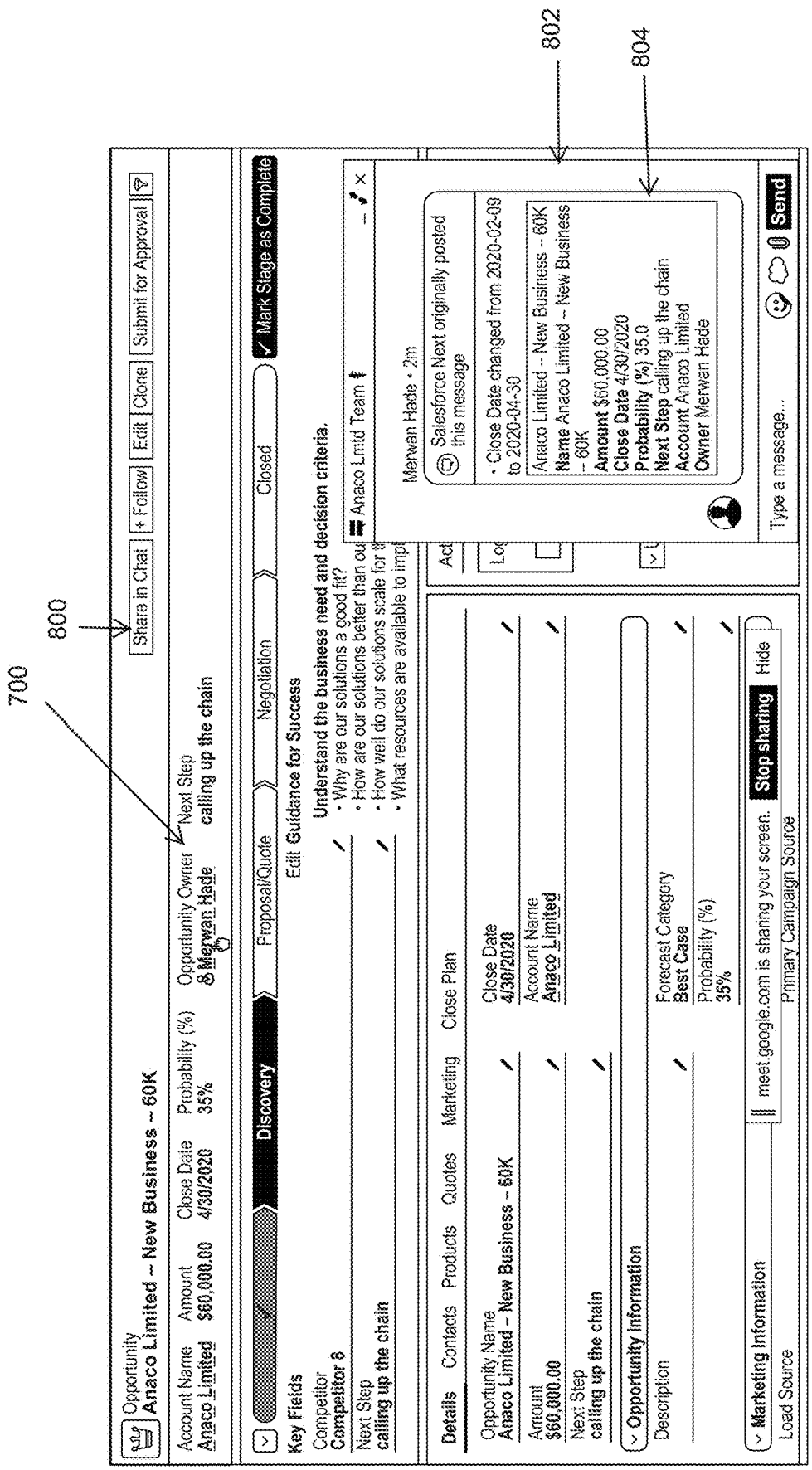
FIG. 8 is a block diagram of an interface of a desktop collaborative application, according to some embodiments.

FIG. 8 is a block diagram of interface 700 of the desktop collaborative application, according to some embodiments. Interface 700 may further include a share in chat button 800 The share in chat button 800 may generate a request to share the database record being displayed on interface 700, in a chat session. The database record may be shared in an existing or new chat session as a unitary user interface element, in response to selecting share in chat button 800.

Interface 700 may also include chat window 802 including a chat session between the user of the desktop collaboration application and one or more other users. The chat session may include a unitary user interface element 804 representing a database record. As indicated above, unitary user interface element 804 may be encoded with a link to the complete database record. Therefore, the user can select the unitary user interface element 804, and in response to selecting unitary user interface element 804, the desktop collaborative application may navigate to and display the complete database record corresponding to unitary user interface element 804.

Figure 9:
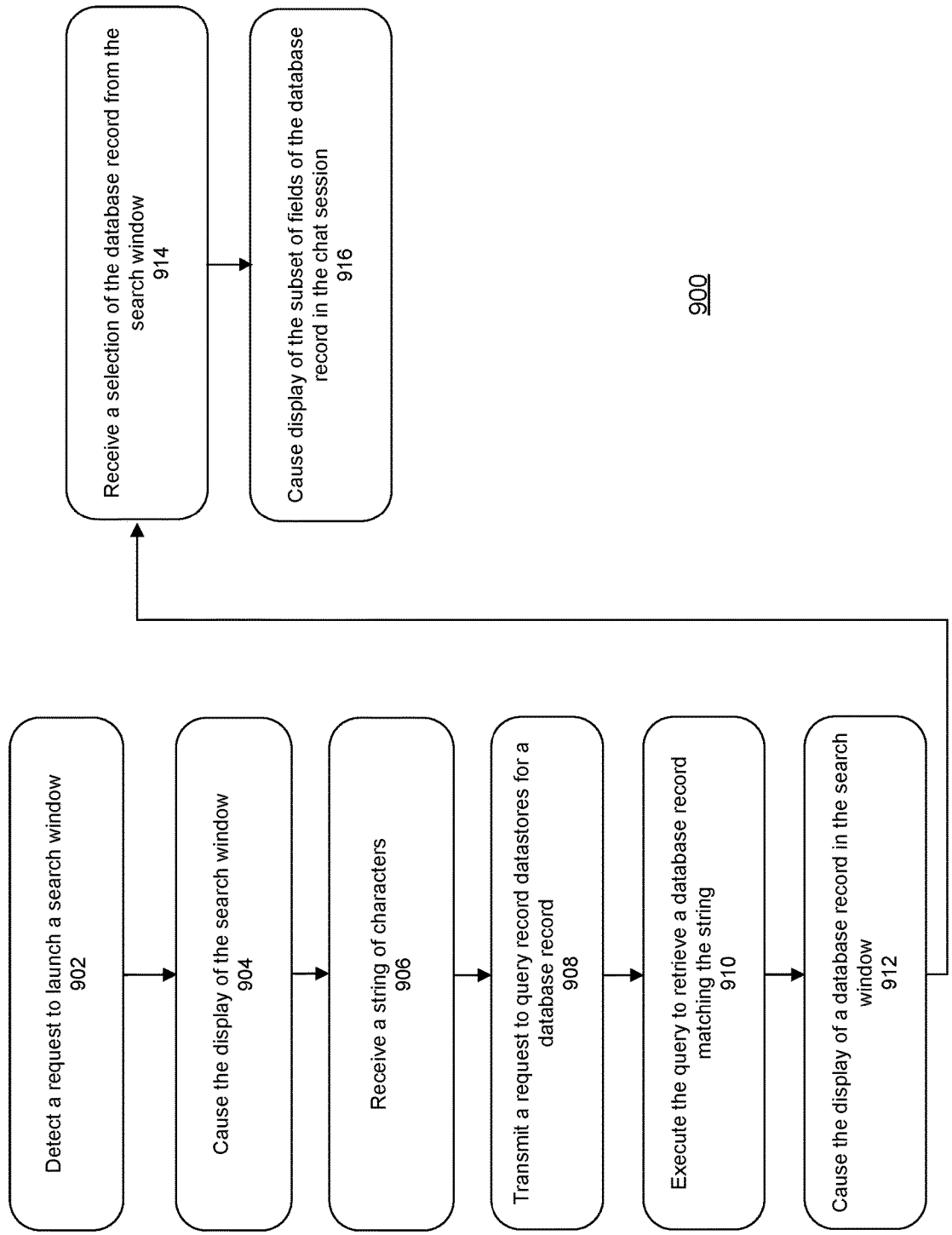
FIG. 9 is a flowchart illustrating a process for displaying searching for and displaying a database record in a chat session, according to some embodiments.

FIG. 9 is a flowchart illustrating a process for displaying searching for and displaying a database record in a chat session, according to some embodiments. Method 900 may be performed by processing logic that may comprise hardware (e.g., circuitry, dedicated logic, programmable logic, microcode, etc.), software (e.g., instructions executing on a processing device), or a combination thereof. It is to be appreciated that not all steps are needed to perform the disclosure provided herein. Further, some of the steps may be performed simultaneously, or in a different order than shown in FIG. 9, as will be understood by a person of ordinary skill in the art.

Method 900 shall be described with reference to FIGS. 1-2. However, method 900 is not limited to that example embodiment.

In operation 902, collaborative communications system 128 detects a request to launch a search window, including an input field. The request occurs in a chat platform executing a chat session between two or more chat participants. The chat platform may include a message composer and input buttons. The message composer may be configured to receive and transmit messages from a chat participant. The input buttons may be configured to search and transmit images, GIFs, emojis, and database records. One of the chat participants may select one of the input buttons on the chat platform corresponding to searching for and transmitting a database record. The selection of the input button may generate the request to launch a search window.

In operation 904, collaborative communications system 128 may cause the display of the search window, including the input field, in the chat platform. The search window may be displayed over the chat session in the chat platform. Alternatively, the search window may be displayed under the message composer. Collaborative communications system 128 may transmit a request to collaborative management system 126 to retrieve a list of database records associated with the chat participant that requested the search window of the database records. Collaborative management system 126 may identify a set of database records associated with the chat participant that requested the search window based on the accounts datastores and database records datastores. Collaborative management system 126 may transmit the set of database records to collaborative communications system 128. Collaborative communications system 128 may cause display of the set of database records in the search window, prior to the user inputting any characters in the input field.

In operation 906, collaborative communications system 128 receives a string via the input field. The string may include alphanumeric characters. Collaborative communications system 128 may receive each character as it is input in the input field. Similarly, collaborative communication system 128 may receive an indication that a character was deleted from the string in the input field.

In operation 908, collaborative communications system 128 transmits a request to collaborative management system 126 to query record datastores 134 for a database record matching the string. The request may be updated in (near) real-time, as the string is modified. For example, if characters are added or removed from the string, the request may be updated to include the updated string.

In operation 910, collaborative management system 126 executes the query to retrieve a database record matching the string. The query is automatically updated upon the update of the request. Updating the querying includes identifying a first database record based on an initially received string and subsequently identifying a second database record based on the modified string.

In operation 912, collaborative communications system 128 may cause the display of a database record in the search window. As indicated above, collaborative management system 126 may update the query in response to a modified string. In response to identifying the first database record, based on the initially received string, the collaborative management system may generate a response to the collaborative communications system 128. The response may include the first database record. Collaborative communications system 128 may cause the display of the first database record in the search window. Subsequently, in response to identifying the second database record based on the modified string, collaborative management system 126 may update the response to the collaborative communications system 128 to include the second database record. Collaborative communications system 128 may cause the display of the second database record instead of the first database record in the search window.

In operation 914, collaborative communications system 128 receives a selection of the database record from the search window. The selection may include a database record identifier. Collaborative communications system 128 may transmit a request for a subset of fields of the database records to the collaborative management system. The subset of fields may be in the request, or may be determined by permission settings, chat preferences, or a combination of both.

In operation 916, collaborative communications system 128 causes display of the subset of fields of the database record in the chat session. The collaborative management system may query record datastores 134 for the subset of fields of the database record. The collaborative management system may generate a unitary user interface element, including the subset of fields of the database record. The collaborative management system may transmit a response, including the unitary user interface element, to collaborative communications system 128. Collaborative communications system 128 causes display of the unitary user interface element, including the subset of fields of the database record.

Figure 10:
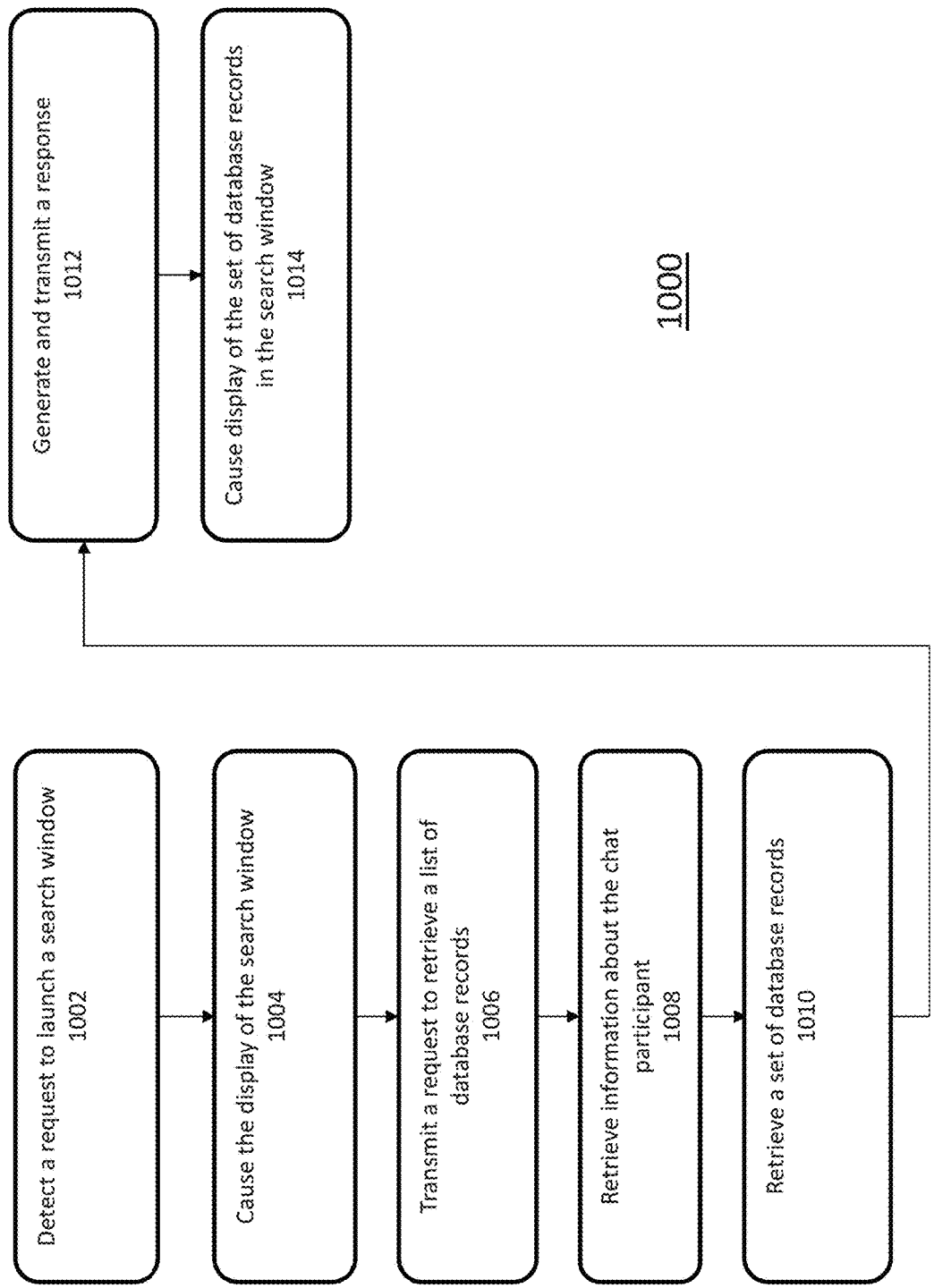
FIG. 10 is a flowchart illustrating a process for displaying an initial set of database records in a chat session, according to some embodiments.

FIG. 10 is a flowchart illustrating a process for displaying an initial set of database records in a chat session, according to some embodiments. Method 1000 may be performed by processing logic that may comprise hardware (e.g., circuitry, dedicated logic, programmable logic, microcode, etc.), software (e.g., instructions executing on a processing device), or a combination thereof. It is to be appreciated that not all steps are needed to perform the disclosure provided herein. Further, some of the steps may be performed simultaneously, or in a different order than shown in FIG. 10, as will be understood by a person of ordinary skill in the art.

Method 1000 shall be described with reference to FIGS. 1-2. However, method 1000 is not limited to that example embodiment.

In operation 1002, collaborative communications system 128 detects a request to launch a search window, including an input field. The request occurs in a chat platform executing a chat session between two or more chat participants. The chat platform may include a message composer and input buttons. The message composer may be configured to receive and transmit messages from a chat participant. The input buttons may be configured to search and transmit images, GIFs, emojis, and database records. One of the chat participants may select one of the input buttons on the chat platform corresponding to searching for and transmitting a database record. The selection of the input button may generate the request to launch a search window.

In operation 1004, collaborative communications system 128 may cause the display of the search window, including the input field, in the chat platform. The search window may be displayed over the chat session in the chat platform. Alternatively, the search window may be displayed under the message composer.

In operation 1006, collaborative communications system 128 transmits a request to collaborative management system 126 to retrieve a list of database records associated with the chat participant that requested the search window of the database records. Database records associated with the chat participant that requested the search window may include database records frequently retrieved by the chat participant, database records recently viewed or modified by the chat participant, or database records that may be of interest to the chat participant based on an attribute of the dataset record. For example, database records may be sales records. The attribute may be a potential sale amount. As such, in response to the potential sale amount being more than a threshold amount, collaborative management system 126 may determine that the sales record may be of interest to the chat participant.

In operation 1008, collaborative management system 126 retrieves information about the chat participant from the accounts datastores. The information may include database records frequently retrieved by the chat participant, database records recently viewed or modified by the chat participant, or database records that may be of interest to the chat participant based on an attribute of the dataset record.

In operation 1010, collaborative management system 126 retrieves a set of database records from the database records datastores based on the retrieved information about the chat participant. For example, the set of database records may include database records associated with the chat participant or of interest to the chat participant, based on the retrieved information about the chat participant.

In operation 1012, collaborative management system 126 generates and transmits a response to collaborative communications system 128. The response includes the set of database records. In particular, the response may include names of the set of database records. Each name may be encoded with a database record identifier.

In operation 1014, collaborative communications system 128 causes display of the set of database records in the search window prior to the user inputting any characters in the input field. The names and an icon of each database record may be displayed in the search window.

Figure 11:
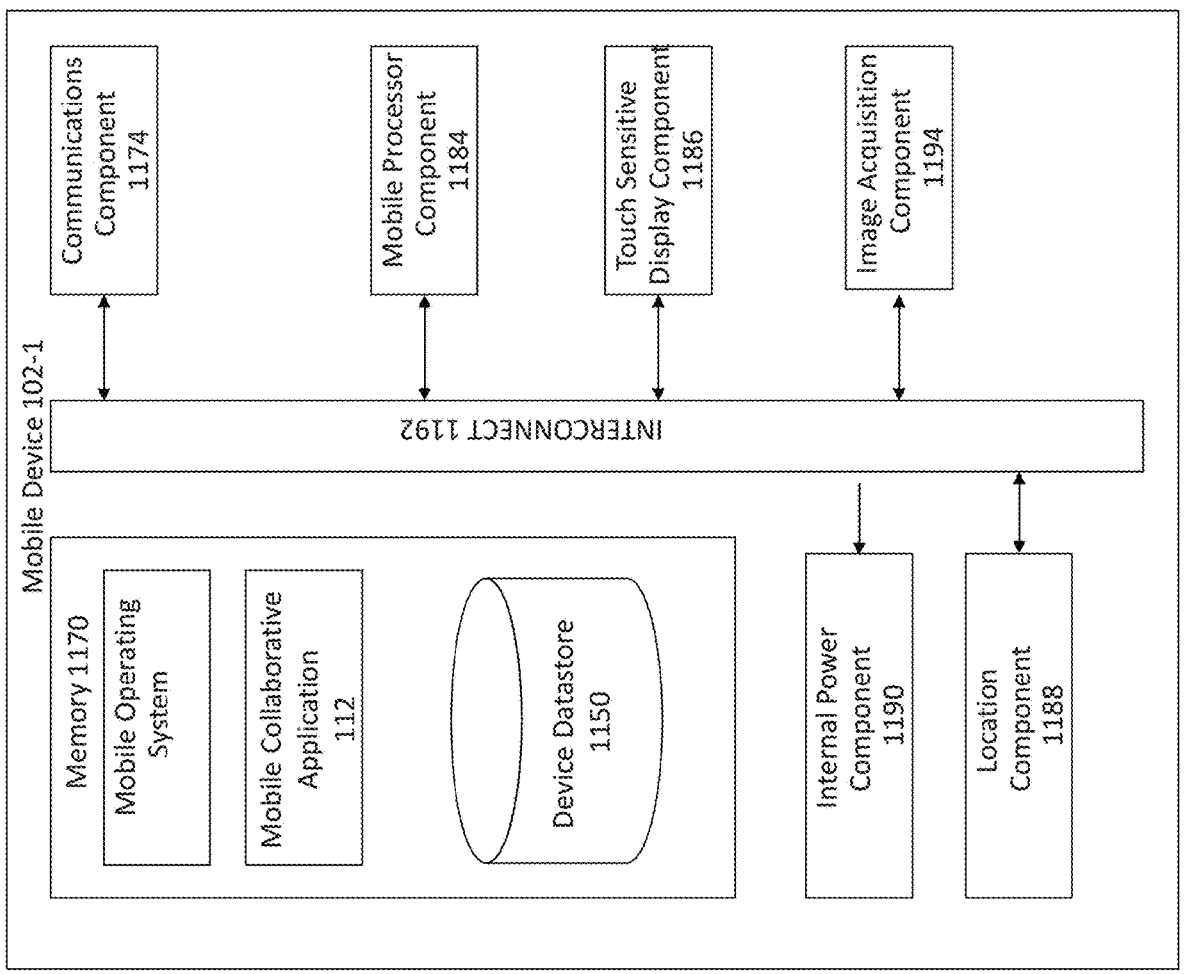
FIG. 11 is a block diagram of example components of a mobile device according to an embodiment.

FIG. 11 illustrates an example block diagram 1100 of an example embodiment of the mobile device 102 executing a mobile collaborative application 112. The mobile device 102 (e.g., a mobile phone, tablet, laptop, etc.) may be generally configured to enable or allow a user to access various collaborative content and engage in real-time instant messaging of one or more target users. It is to be appreciated that while FIG. 11 illustrates one example embodiment of the mobile device 102, the example embodiment is not limited to this context.

In one embodiment, the mobile device 102 may be generally arranged to provide mobile computing and/or mobile communications and may include, but are not limited to, memory 1170, communications component 1174, mobile processor component 1184, touch sensitive display component 1186, location component 1188, internal power component 1190, and image acquisition component 1194, where each of the components and memory 1170 may be operatively connected via interconnect 1192.

In one embodiment, the memory 1170 may be generally arranged to store information in volatile and/or nonvolatile memory, which may include, but is not limited to, read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM) flash memory, polymer memory such as ferroelectric polymer memory, ovonic memory, phase change or ferroelectric memory, silicon-oxide-nitride-oxide-silicon (SONOS) memory, solid state memory devices (e.g., USB memory, solid state drives SSD, etc.), and/or any other type of storage media configured for storing information.

In one embodiment, the memory 1170 may include instruction information arranged for execution by the mobile processor component 1184. In that embodiment, the instruction information may be representative of at least one operating system 1172, one or more applications, which may include, but are not limited to, mobile collaborative application 112. In an embodiment, the memory 1170 may further include device datastore 1150 which may be configured to store information associated with the mobile collaborative application 112 (e.g., cached chat history, etc.).

In one embodiment, the mobile operating system 1172 may include, without limitation, mobile operating systems (e.g., Apple®, iOS®, Google® Android®, Microsoft® Windows Phone®, Microsoft® Windows®, etc.) generally arranged to manage hardware resources (e.g., one or more components of the mobile device 102, etc.) and/or software resources (e.g., one or more applications of the mobile device 102, etc.).

In one embodiment, the communications component 1174 may be generally arranged to enable the mobile device 102 to communicate, directly and/or indirectly, with various devices and systems (e.g., collaborative communications system 128, etc.). The communications component 1174 may include, among other elements, a radio frequency circuit (not shown) configured for encoding and/or decoding information and receiving and/or transmitting the encoded information as radio signals in frequencies consistent with the one or more wireless communications standards (e.g., Bluetooth, Wireless IEEE 802.11, WiMAX IEEE 802.16, Global Systems for Mobile Communications (GSM), Enhanced Data Rates for GSM Evolution (EDGE), Long Term Evolution (LTE), Bluetooth standards, Near Field Communications (NFC) standards, etc.).

In one embodiment, the mobile processor component 1184 may be generally arranged to execute instruction information, which may generally including one or more executable and/or interpretable instructions. In an embodiment, the processor component 1184 may be a mobile processor component or system-on-chip (SoC) processor component. The processor component 1184, may comprise, among other elements, processor circuit, which may further include, but is not limited to, at least one set of electronic circuits arranged to execute one or more instructions. Examples of mobile processor components 1184 may include, but is not limited to, Qualcomm® Snapdragon®, NVidia® Tegra®, Intel® Atom®, Samsung® Exynos, Apple® A7@-A13@, or any other type of mobile processor(s) arranged to execute the instruction information including the one or more instructions stored in memory 1170.

In one embodiment, the touch sensitive display component 1186 may be generally arranged to receive and present visual display information, and provide touch input information based on detected touch based or contact based input. Moreover, the touch sensitive display component 1186 may include, among other elements, display device (e.g., liquid-crystal display, light-emitting diode display, organic light-emitting diode display, etc.) for presenting the visual display information and touch sensor(s) (e.g., resistive touch sensor, capacitive touch sensor, etc.) associated with the display device 1168 to detect and/or receive touch or contact based input information associated with the display device of the mobile device 102-1. Additionally, the touch sensor(s) may be integrated with the surface of the display device, so that a user's touch or contact input may substantially correspond to the presented visual display information on the display device, such as, for example, one or more user interface (UI) views and elements discussed and illustrated herein.

In one embodiment, the location component 1188 may be generally arranged to receive positioning signals representative of positioning information and provide location information (e.g., approximate physical location of the mobile device 102-1) determined based at least partially on the received positioning information. Moreover, the location component 1188 may include, among other elements, positioning circuit (e.g., a global positioning system (GPS) receiver, etc.) arranged to determine the physical location of the mobile device 102. In some embodiments, the location component 1188 may be further arranged to communicate and/or interface with the communications component 1174 in order to provide greater accuracy and/or faster determination of the location information.

In one embodiment, the internal power component 1190 may be generally arranged to provide power to the various components and the memory of the mobile device 102. In one embodiment, the internal power component 1190 may include and/or be operatively coupled to an internal and/or external battery configured to provide power to the various components (e.g., communications component 1174, motion component 1176, memory 1170, etc.). The internal power component 1190 may also be operatively coupled to an external charger to charge the battery.

In one embodiment, the image acquisition component 1194 may be generally arranged to generate a digital image information using an image capture device such as, for example, a charged coupled device (CCD) image sensor (Not shown). Moreover, the image acquisition component 1194 may be arranged to provide or otherwise stream digital image information captured by a CCD image sensor to the touch sensitive display component 1186 for visual presentation via the interconnect 1192, the mobile operating system 1172, mobile processor component 1184.

Figure 12:
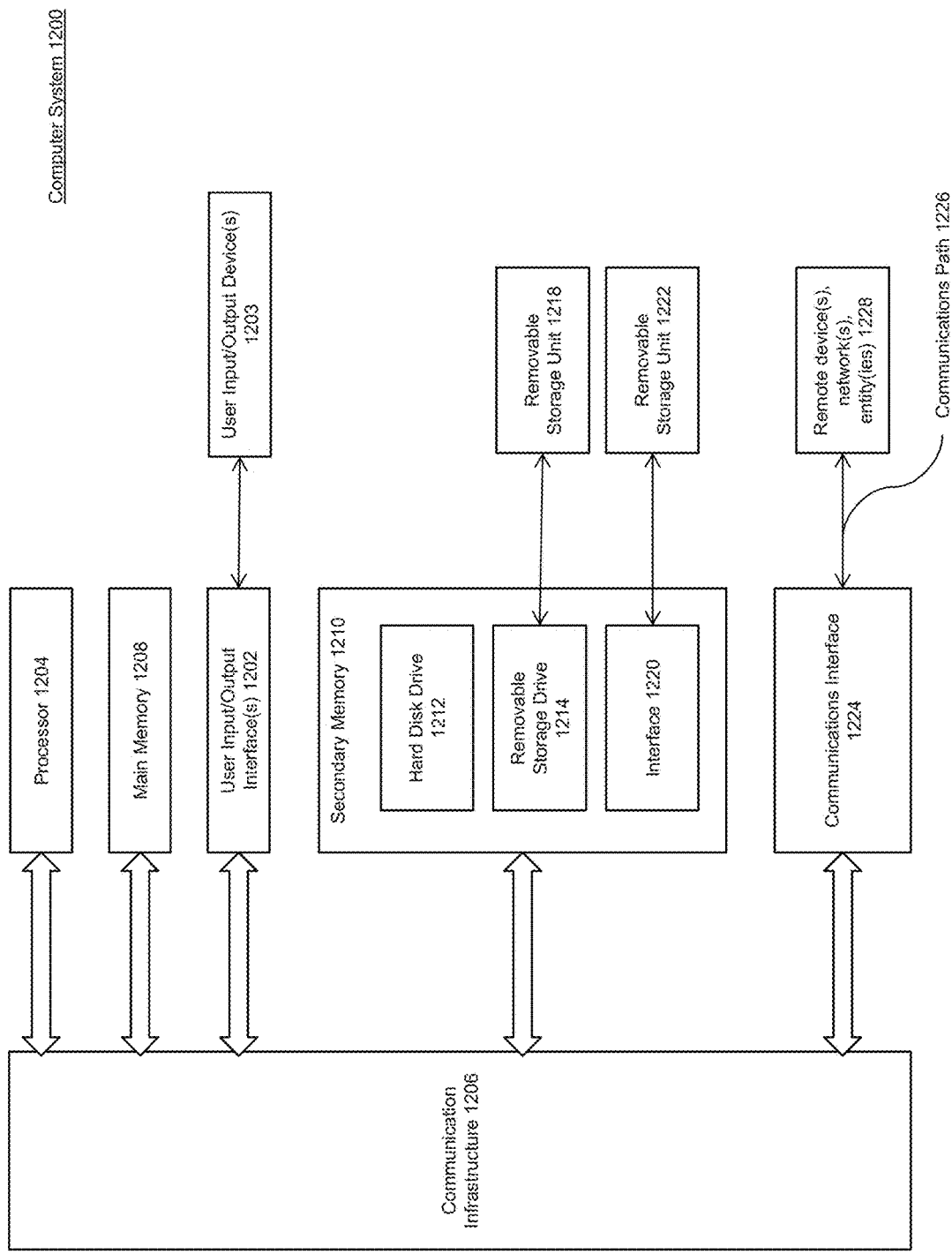
FIG. 12 is a block diagram of example components of a computing system according to an embodiment.

FIG. 12 illustrates an example computer system 1200 useful for implementing various embodiments. Moreover, various embodiments may be implemented, for example, using one or more well-known computer systems, such as computer system 1200 shown in FIG. 12. One or more computer systems 1200 may be used, for example, to implement any of the embodiments discussed herein, as well as combinations and sub-combinations thereof. For example, the computer system 1200 may implement the one or more computing devices 104-a. In another example, one or more computing systems 1200 may be communicatively coupled to each other, where each is configured to execute one or more virtual machines (not shown). The one or more virtual machines may be managed or otherwise orchestrated by one or more virtual machine managers (not shown) configured to provision and/or configure one or more virtual machines to the one or more computing systems 1200. The one or more virtual machines may be further configured as a Software as a Service (SaaS), Platform as a Service (PaaS) and/or an Infrastructure as a Service (IaaS) provider configured to host or otherwise execute one or more applications associated with one or more gateways, systems, and/or datastores of FIG. 1.

Computer system 1200 may include one or more processors (also called central processing units, or CPUs), such as a processor 1204. Processor 1204 may be connected to a communication infrastructure or bus 1206.

Computer system 1200 may also include customer input/output device(s) 1203, such as monitors, keyboards, pointing devices, etc., which may communicate with communication infrastructure 1206 through customer input/output interface(s) 1202.

One or more of processors 1204 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1200 may also include a main or primary memory 1208, such as random access memory (RAM). Main memory 1208 may include one or more levels of cache. Main memory 1208 may have stored therein control logic (i.e., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, tape backup device, and/or any other storage device/drive.

Removable storage drive 1214 may interact with a removable storage unit 1218. Removable storage unit 1218 may include a computer usable or readable storage device having stored thereon computer software (control logic) and/or data. Removable storage unit 1218 may be a floppy disk, magnetic tape, compact disk, DVD, optical storage disk, and/any other computer data storage device. Removable storage drive 1214 may read from and/or write to removable storage unit 1218.

Secondary memory 1210 may include other means, devices, components, instrumentalities or other approaches for allowing computer programs and/or other instructions and/or data to be accessed by computer system 1200. Such means, devices, components, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 may enable computer system 1200 to communicate and interact with any combination of external devices, external networks, external entities, etc. (individually and collectively referenced by reference number 1228). For example, communication interface 1224 may allow computer system 1200 to communicate with external or remote devices 1228 over communications path 1226, which may be wired and/or wireless (or a combination thereof), and which may include any combination of LANs, WANs, the Internet, etc. Control logic and/or data may be transmitted to and from computer system 1200 via communication path 1226.

Computer system 1200 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1200 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1200 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 12. In particular, embodiments may operate with software, hardware, and/or operating system implementations other than those described herein.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the disclosure that others may, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

What is claimed is:

1. A method comprising:
   detecting, by one or more computing devices, a request to launch a search window comprising an input field, wherein the request occurs in a chat platform executing a chat session between two or more chat participants communicating in real-time via an instant messaging interface;
   causing, by the one or more computing devices, display of the search window based on the request to launch the search window;
   receiving, by the one or more computing devices, a string via the input field;
   transmitting, by the one or more computing devices, a query including the string to a database, wherein based on a modification of the string, the query is automatically updated with the modified string;
retrieving, by the one or more computing devices, based on the query, a result that comprises a database record matching the modified string, wherein the query is automatically updated for each character received from the modified string;
causing, by the one or more computing devices, display of the result that comprises the database record in the search window;
receiving, by the one or more computing devices, via the search window, a selection of the database record;
retrieving, by the one or more computing devices, based on the selected database record, a permission setting for each of the two or more chat participants;
determining, by the one or more computing devices, a subset of fields of the database record that each chat participant of the two or more chat participants may view based on the permission setting for each chat participant of the two or more chat participants; and
causing, by the one or more computing devices, display of the subset of fields of the database record to each of the two or more chat participants in the chat session, wherein the subset of fields of the database record are editable within the chat session by each of the two or more chat participants.

2. The method of claim 1, wherein the automatic update of the query includes: identifying a first database record based on a first portion of the string; and identifying a second database record based on the first portion of the string and a second portion of the string, and wherein the second portion of the string is received after the first portion of the string.

3. The method of claim 1, wherein the chat platform includes a message composer configured to receive messages to be transmitted in the chat session.

4. The method of claim 3, further comprising;
detecting, by one or more computing devices, input of a predetermined character in the message composer; and
causing, by the one or more computing devices, display of a list of chat participants in response to detecting input of the predetermined character.

5. The method of claim 1, wherein detecting the request to launch the search window is in response to receiving a selection of a button.

6. The method of claim 1, further comprising retrieving, by the one or more computing devices, the subset of fields from the database in response to receiving the selection of the database record.

7. The method of claim 1, wherein the subset of fields of the database record is displayed in the chat session as a unitary user interface element.

8. The method of claim 1, wherein the chat session includes transmissions between the two or more chat participants.

9. A system comprising:
a memory;
a processor coupled to the memory, the processor configured to:
detect a request to launch a search window comprising an input field, wherein the request occurs in a chat platform executing a chat session between two or more chat participants communicating in real-time via an instant messaging interface;
cause, based on the request to launch the search window, display of the search window;
receive a string via the input field;
transmit a query including the string to a database, wherein based on a modification of the string the query is automatically updated with the modified string;
retrieve, based on the query, a result that comprises a database record matching the modified string, wherein the query is automatically updated for each character received from the modified string;
cause display of the result that comprises the database record in the search window;
receive, via the search window, a selection of the database record;
retrieve, based on the selected database record, a permission setting for each of the two or more chat participants;
determine a subset of fields of the database record that each chat participant of the two or more chat participants may view based on the permission setting for each chat participant of the two or more chat participants; and
cause display of the subset of fields of the database record to each of the two or more chat participants in the chat session, wherein the subset of fields of the database record are editable within the chat session by each of the two or more chat participants.

10. The system of claim 9, wherein the automatic update of the query includes: identifying a first database record based on a first portion of the string; and identifying a second database record based on the first portion of the string and a second portion of the string, and wherein the second portion of the string is received after the first portion of the string.

11. The system of claim 9, wherein the chat platform includes a message composer configured to receive messages to be transmitted in the chat session.

12. The system of claim 11, the processor further configured to:
detect input of a predetermined character in the message composer; and
cause a list of chat participants to be displayed in response to detecting input of the predetermined character.

13. The system of claim 9, wherein detecting the request to launch the search window is in response to receiving a selection of a button.

14. The system of claim 9, the processor being further configured to retrieve the subset of fields from the database in response to receiving the selection of the database record.

15. The system of claim 9, wherein the subset of fields of the database record is displayed in the chat session as a unitary user interface element.

16. The system of claim 9, wherein the chat session includes transmissions between the two or more chat participants.

17. A non-transitory computer-readable medium having instructions stored thereon, execution of which, by one or more processors of a device, cause the one or more processors to perform operations comprising:
detecting a request to launch a search window comprising an input field, wherein the request occurs in a chat platform executing a chat session between two or more chat participants communicating in real-time via an instant messaging interface;
causing, based on the request to launch the search window, display of the search window;
receiving a string via the input field;
transmitting a query including the string to a database, wherein based on a modification of the string the query is automatically updated with the modified string;

retrieving, based on the query, a result that comprises a database record matching the modified string, wherein the query is automatically updated for each character received from the modified string;

causing display of the result that comprises the database record in the search window;

receiving, via the search window, a selection of the database record;

retrieving, based on the selected database record, a permission setting for each of the two or more chat participants;

determining a subset of fields of the database record that each chat participant of the two or more chat participants may view based on the permission setting for each chat participant of the two or more chat participants; and causing display of the subset of fields of the database record to each of the two or more chat participants in the chat session, wherein the subset of fields of the database record are editable within the chat session by each of the two or more chat participants.

18. The non-transitory computer-readable medium of claim 17, wherein the automatic update of the query includes: identifying a first database record based on a first portion of the string; and identifying a second database record based on the first portion of the string and a second portion of the string, and wherein the second portion of the string is received after the first portion of the string.

19. The non-transitory computer-readable medium of claim 17, wherein the chat platform includes a message composer and the operations further comprise:

detecting input of a predetermined character in the message composer; and causing display of a list of chat participants in response to detecting input of the predetermined character.

20. The non-transitory computer-readable medium of claim 17, the operations further comprising retrieving the subset of fields from the database in response to receiving the selection of the database record.

* * * * *